US009101878B2

(12) United States Patent
Plati et al.

(10) Patent No.: US 9,101,878 B2
(45) Date of Patent: *Aug. 11, 2015

(54) CATALYTIC CONVERTER APPARATUS

(71) Applicant: Vida Holdings Ltd., Woodbridge (CA)

(72) Inventors: Stefano Plati, Woodbridge (CA); Michael Decesare, Toronto (CA); Sarry Al-Turk, Toronto (CA); Amanda Sistilli, Etobicoke (CA); Gregory Kiyoshi Koyanagi, Toronto (CA); Voislav Blagojevic, Toronto (CA)

(73) Assignee: Vida Holdings Ltd., Woodbridge, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,123

(22) Filed: Nov. 26, 2014

(65) Prior Publication Data

US 2015/0086454 A1    Mar. 26, 2015

Related U.S. Application Data

(60) Continuation of application No. 14/080,483, filed on Nov. 14, 2013, which is a continuation of application No. 13/644,859, filed on Oct. 4, 2012, now abandoned, which is a division of application No. 12/548,676, filed on Aug. 27, 2009, now Pat. No. 8,309,032.

(60) Provisional application No. 61/092,110, filed on Aug. 27, 2008.

(51) Int. Cl.
*B01D 50/00* (2006.01)
*B01D 53/86* (2006.01)
*B01D 53/62* (2006.01)
*B01D 53/56* (2006.01)

(52) U.S. Cl.
CPC .......... *B01D 53/8656* (2013.01); *B01D 53/565* (2013.01); *B01D 53/62* (2013.01)

(58) Field of Classification Search
CPC ............ F01N 2310/06; F01N 2330/34; F01N 2510/0682; F01N 3/2807; F01N 13/14; B01D 53/9454
USPC .................................. 422/177, 180; 423/212
See application file for complete search history.

(56) References Cited

U.S. PATENT DOCUMENTS 8,309,032 B2 * 11/2012 Plati et al. ..................... 422/177

* cited by examiner

*Primary Examiner* — Tom P Duong
(74) *Attorney, Agent, or Firm* — Head, Johnson & Kachigian, P.C.

(57) ABSTRACT

A catalytic converter apparatus for use in an exhaust system of an internal combustion engine includes a housing having a gas inlet and a gas outlet, and at least one catalytic substrate element disposed in the housing. The at least one substrate element is divided into a plurality of zones or sections, the zones at least partially separated from one another to inhibit heat flow. The zones can be at least partially separated with walls. The walls can include insulating material for reducing the mobility of heat radially outwardly. Each of the zones defines a generally separate flow passage connecting the inlet and outlet in fluid communication. The apparatus can heat more rapidly from a cold start compared with conventional catalytic converters.

8 Claims, 18 Drawing Sheets

CATALYTIC CONVERTER APPARATUS

CROSS-REFERENCE TO PENDING APPLICATIONS

This application is a continuation application of U.S. patent application Ser. No. 14/080,483 filed Nov. 14, 2013 entitled "Catalytic Converter Apparatus" which is a continuation of U.S. patent application Ser. No. 13/644,859 filed Oct. 4, 2012, now abandoned, which is a divisional application of U.S. patent application Ser. No. 12/548,676 filed Aug. 27, 2009, now U.S. Pat. No. 8,309,032, which claims the benefit of U.S. Provisional Application No. 61/092,110 filed Aug. 27, 2008, which is hereby incorporated by reference in its entirety.

BACKGROUND OF THE INVENTION

1. Field of the Invention

This specification relates to a catalytic converter apparatus for an internal combustion engine.

2. Prior Art

The following paragraphs are not an admission that anything discussed in them is prior art or part of the knowledge of persons skilled in the art.

U.S. Pat. No. 4,394,351 to Gast discloses a discloses catalytic converter having upstream and downstream located substrates and a configuration such that the exhaust gas flow is non-uniformly distributed across the upstream frontal areas of each of the substrates and concentrated centrally of such frontal areas. The converter further has a chamber located between said substrates. An air distribution tube having an open end adapted to be connected to the pulsed air supply extends through and across the chamber substantially normal to the exhaust gas flowing between the substrates and terminates with a closed end. The tube within the chamber has a plurality of holes which are sized and spaced along the tube to non-uniformly distribute the pulsed air supply throughout the chamber in a manner to provide a resultant air flow distribution conforming with the non-uniform distribution of exhaust gas. Flow dividers are spaced along the tube and extend substantially parallel to the flow of exhaust gas between the substrates in a manner to partition the chamber into a plurality of discrete channels each open to selected ones of the holes to receive one portion only of the non-uniform distribution of the pulsed air supply and one portion only of the non-uniformly distributed exhaust gas whereby the non-uniform air flow distribution is maintained between the channels while the exhaust gas is flowing between the substrates to prevent the exhaust gas from entering the downstream substrate with an improper mix of pulsed air so that the conversion efficiency of the downstream substrate is maximized U.S. Pat. No. 5,578,277 to White et al. discloses a modular catalytic converter and muffler used to purify exhaust from a relatively large diesel engine. The device includes various structural components that are mounted in the exhaust flow path within a housing having an inlet and an outlet. A plate mounted within the housing divides the housing into an inlet chamber and an outlet chamber. A plurality of catalytic converter sub-cans are mounted across the plate between the inlet chamber and the outlet chamber. A flow distributor is mounted within the housing upstream of the catalytic converter sub-cans. The flow distributor divides and directs a portion of the exhaust to each of the catalytic converter sub-cans. Some muffler structure is mounted within the housing between the catalytic converter sub-cans and the outlet in order to attenuate noise in the exhaust.

U.S. Pat. No. 7,210,287 to Bolander et al. discloses a method of reducing exhaust emission from a catalytic converter apparatus of a vehicle, the apparatus including at least one catalytic converter, each of the at least one catalytic converter having a catalyst brick positioned within a predefined length of the vehicle. The method includes directing exhaust to pass more than once through the predefined length through at least one of the at least one catalyst brick. The converter apparatus can accelerate catalyst conversion reactions and thus accelerate converter system light-off.

SUMMARY OF THE INVENTION

In an aspect of this specification, a catalytic converter apparatus for use in an exhaust system of an internal combustion engine can include: a housing, the housing including a gas inlet and a gas outlet; and at least one substrate element arranged in the housing, the at least one substrate element including catalytic material, the at least one substrate element divided into a plurality of zones, each of the zones defining a generally separate flow passage connecting the inlet and the outlet in fluid communication.

The apparatus can further include at least one wall at least partially separating the plurality of zones. The at least one wall can include insulating material for inhibiting heat flow between the zones. Thickness of the insulating material between the zones can be varied. The insulating material can have a thickness between the zones of less than 10 mm. The insulating material can include ceramic fiber material.

The at least one wall can separate the zones so as to be generally impervious to gas flow between adjacent zones. The at least one wall can separate the zones along substantially an entire length of the zones in a direction extending from the inlet to the outlet. The zones can include a central zone and at least one radial zone. The at least one wall separating the central substrate zone from the at least one radial zone can include at least one connecting portion.

The at least one substrate element can substantially fill the housing in a radial dimension perpendicular to a direction of gas flow extending from the inlet to the outlet. The zones can be arranged generally in parallel in a direction of gas flow extending from the inlet to the outlet. Cross-sectional areas of the zones in a plane perpendicular to a direction of gas flow extending from the inlet to the outlet can be varied. Zones centrally located can have a larger cross-sectional area than zones peripherally located.

Each of the zones can be of like cross-sectional shape in a plane orthogonal to a direction of gas flow. The shape can be selected from the group consisting of trapezoids, rectangles, squares, triangles, hexagons and circles.

Loadings of the catalytic material in the zones can be varied. For example, loadings of the catalytic material in zones centrally located can be greater than loadings of the catalytic material in zones peripherally located. Similarly, catalytic surface areas of the zones of the at least one substrate can be varied. For example, catalytic surface areas of the zones centrally located can be greater than catalytic surface areas of the zones peripherally located.

In an aspect of this specification, a catalytic converter apparatus for use in an exhaust system of an internal combustion engine can include: a housing, the housing including a gas inlet and a gas outlet; at least one substrate element arranged in the housing, the at least one substrate element including catalytic material, the at least one substrate element divided into a plurality of zones, the zones arranged generally in parallel in a direction of gas flow extending from the inlet to the outlet, each of the zones defining a generally separate flow passage connecting the inlet and the outlet in fluid communication; and at least one wall at least partially separating the plurality of zones, the at least one wall separating the zones so as to be generally impervious to gas flow between adjacent zones, the at least one wall including insulating material.

A method of reducing emissions from an internal combustion engine can include providing the catalytic converter apparatus as described above and placing the inlet of the apparatus in fluid communication with an exhaust gas stream of the engine.

In an aspect of this specification, a method of reducing emissions from an internal combustion engine can include: delivering an exhaust gas stream from the internal combustion engine to at least one substrate element having a plurality of zones, the at least one substrate element including catalytic material located therein, the zones at least partially separated from one another so that heat flow between the zones is at least partially inhibited by the insulating material, each of the zones defining a generally separate flow passage; passing the stream through the plurality of zones thereby causing the stream to separate into a plurality of individual streams, the individual streams reacting with the catalytic material of the substrate element to form a plurality of treated streams; and expelling the treated streams.

Other aspects and features of the teachings disclosed herein will become apparent, to those ordinarily skilled in the art, upon review of the following description of the specific examples of the specification.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION OF THE PREFERRED EMBODIMENTS

Figure 1A:
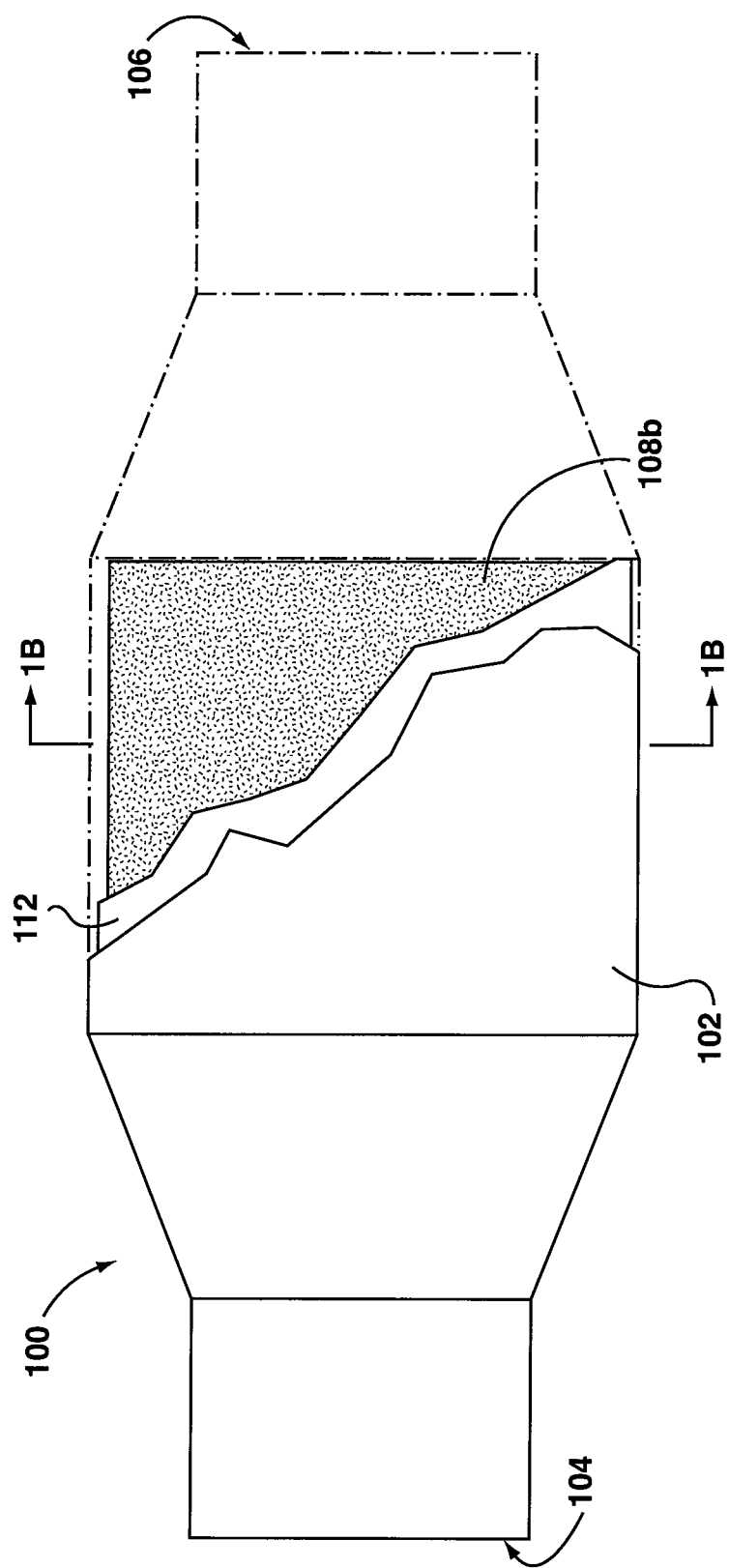
FIG. 1A is a side cutaway view of an apparatus.

Various apparatuses or methods will be described below to provide an example of embodiment of each claimed invention. No embodiment described below limits any claimed invention and any claimed invention may cover apparatuses or methods that are not described below. One or more inventions may reside in a combination or sub-combination of the apparatus sections or method steps described below or in other parts of this document. The claimed inventions are not limited to apparatuses or methods having all of the features of any one apparatus or method described below or to features common to multiple or all of the apparatuses described below. It is possible that an apparatus or method described below is not an embodiment of any claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Catalytic converters are widely used in motor vehicle exhaust systems to reduce the toxicity of emissions. In a typical catalytic converter, a substrate can take the form of a cylinder-shaped porous unitary structure that is coated with catalytic materials. A typical converter can contain two separate catalyst-coated stages: the first catalyst stage for reduction of NOx, and the second stage for oxidation of CO and hydrocarbons. The substrate is usually formed of porous ceramic material, or in some cases, stainless steel. From a cold start, catalytic material in the catalytic converter heats up as emission gases pass therethrough, the conversion of exhaust gases is accelerated and emission levels decrease.

Conventional catalytic converters typically only work efficiently once the substrate has reached relatively high operating temperatures. Operating temperatures can take several minutes to attain after engine startup. In some examples, catalytic converters consisting of a unitary ceramic catalyst substrate can have a "light-off" temperature (the temperature at which the catalytic converter is converting at 50% efficiency) of about 300° C., and an operating temperature of about 500° C. to 600° C. During the time it takes for the substrate to reach operating temperatures, untreated toxic components are being emitted from the exhaust system.

Applicant's teachings relate to a catalytic converter apparatus having at least one substrate element that is divided or separated into a plurality of zones or sections. The zones can be at least partially separated from one another by walls to inhibit heat flow between the zones. The walls can include insulating material for reducing the mobility of heat radially outwardly. The zones can heat up generally independently of one another, enabling relatively rapid heating. Rapid heating can allow for a reduction in the amount of time required to achieve operating temperatures at which efficient conversion takes place. Use of the apparatus therefore can reduce the amount of untreated toxic components being emitted from the exhaust system during as compared with conventional catalytic converters with unitary or monolithic substrates. Furthermore, the walls can provide for better heat retention within the apparatus, which can serve to maintain an elevated temperature during shutoff or engine idling. Moreover, in some examples, apparatuses in accordance with the Applicant's teachings can be more resilient to mechanical and thermal stress as compared with conventional catalytic converters with unitary or monolithic substrates.

Figure 1B:
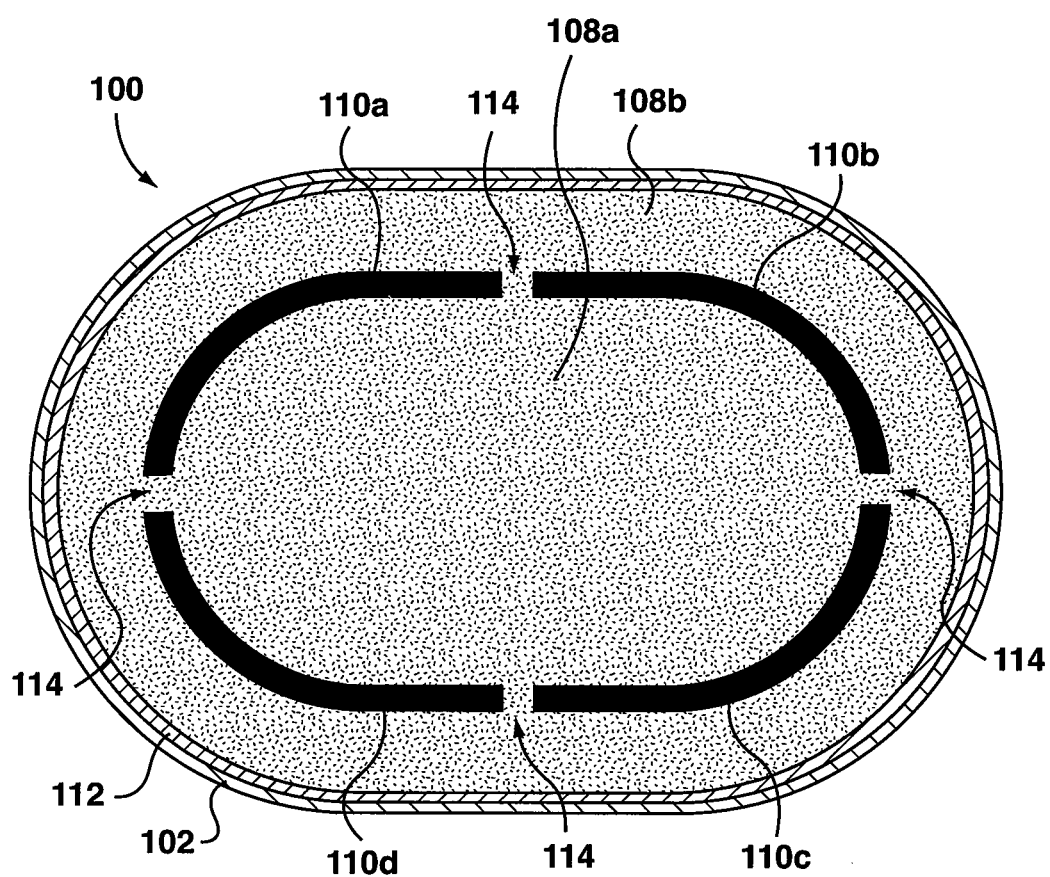
FIG. 1B is a sectional view of the apparatus of FIG. 1A.
Figure 1C:
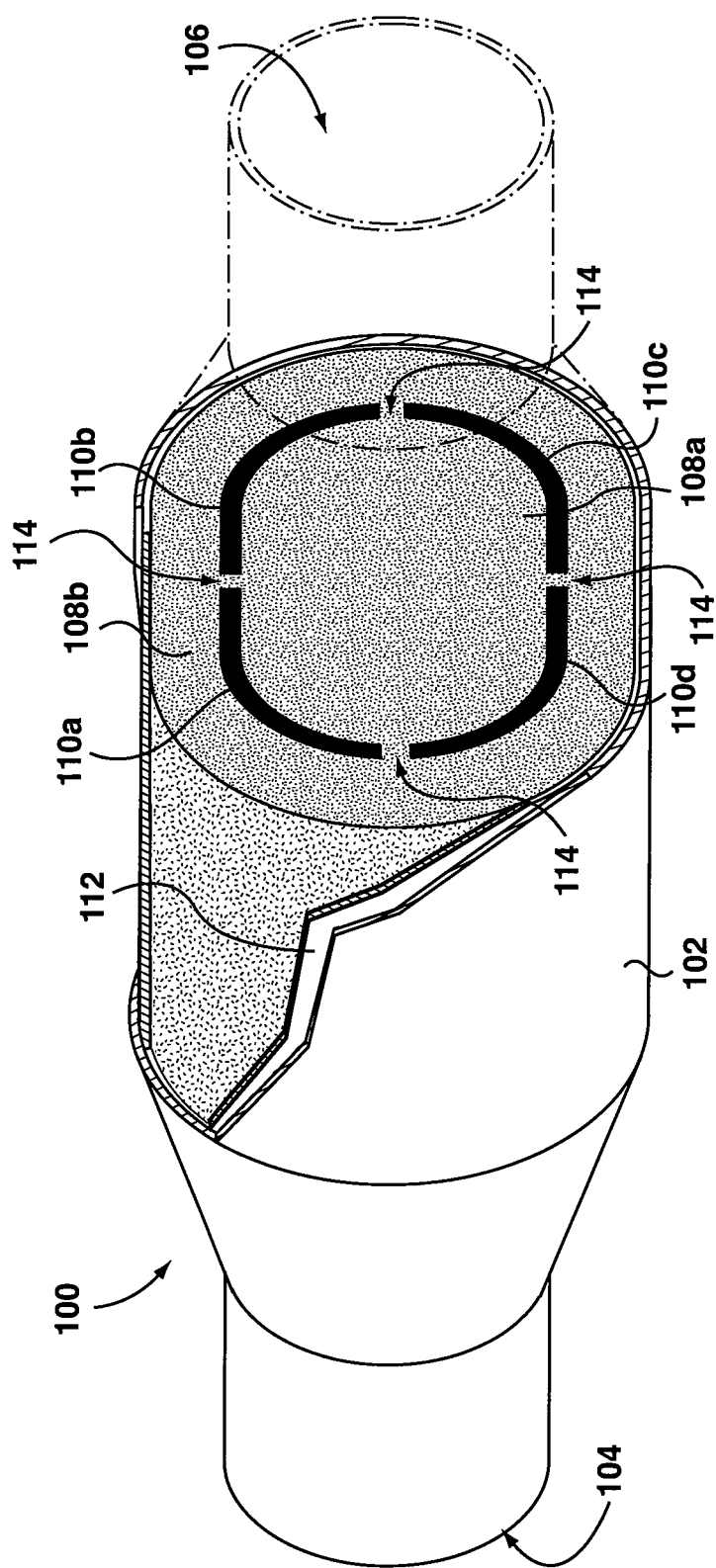
FIG. 1C is a perspective cutaway view of the apparatus of FIG. 1A.

Referring to FIGS. 1A, 1B and 1C, an example of a catalytic converter apparatus is shown generally at 100. The apparatus 100 is for use in an exhaust system of an internal combustion engine (not shown). The apparatus 100 includes a housing 102. The housing 102 can be, for example but not limited to, roughly cylindrical, having oval, circular or elliptical cross-sectional shapes. Various shapes and dimensions of the housing 102 are possible. The housing 102 includes a gas inlet 104, and a gas outlet 106 spaced apart from the inlet 104.

The apparatus 100 includes at least one substrate element 108 arranged in the housing 102. The substrate element 108 is divided or separated into zones or sections 108a, 108b. The zones 108a, 108b can be laterally arranged with each defining a generally separate chamber or flow passage connecting the inlet 104 and the outlet 106 in fluid communication.

The zones 108a, 108b can be at least partially separated from one another by at least one wall 110. The walls 110 can extend along substantially an entire length of the zones 108a, 108b in a direction extending from the inlet 104 to the outlet 106. The walls 110 can separate each of the zones 108a, 108b from one another so as to be generally impervious to gas flow between the zones 108a, 108b. At least a portion of the walls 110 can include insulating material, as discussed in further detail below.

The at least one substrate element 108 can be formed from a generally porous ceramic, or stainless steel structure, including ceramic formulations and stainless steel materials that are used in existing catalytic converters. The substrate element 108 includes catalytic material for converting exhaust gases. The catalytic material can be any suitable material operable to conduct the oxidation/reduction reactions desirable to convert the vehicle emissions. In some examples, where three-way conversion is desired, each of the zones 108a, 108b can comprise two separate catalyst-coated stages arranged in series (not shown).

The zones 108a, 108b can substantially fill the housing 102 in a radial or lateral dimension relative to an axis of gas flow from the inlet 104 to the outlet 106. The zones 108a, 108b can be arranged generally in parallel in a direction extending from the inlet 104 to the outlet 106.

The zones 108a, 108b can be at least partially separated from one another with walls 110, reducing heat mobility within the apparatus 100. As illustrated in this particular example, the at least one wall 110 can be separated into wall sections 110a, 110b, 110c, 110d by connecting portions 114. The connecting portions 114 provide structural support between the zones 108a, 108b, which can aid manufacturing.

Specifically, a unitary substrate element including zones 108a, 108b can be formed by an extrusion process, with voids for each of the wall 110a, 110b, 110c, 110d. The voids can be subsequently injection molded with insulating material to form the walls 110a, 110b, 110c, 110d. Subsequent to extruding the zones 108a, 108b and prior to injection molding the walls 110a, 110b, 110c, 110d, the connecting portions 114 can provide structural support between the zones 108a, 108b.

The walls 110 can be formed partially or entirely of insulating material. In some particular examples, walls 110 can at least partially include a ceramic fiber insulating material, for example but not limited to, FIBERFRAX XFP™ materials (Unifrax Corporation of Niagara Falls, N.Y.). In some other particular examples, walls 110 can at least partially include moldable cements, for example but not limited to FIBERFRAX LDS MOLDABLE™ materials (Unifrax Corporation of Niagara Falls, N.Y.). In other examples, walls 110 can at least partially include other insulating materials such as aerogels or nanogels, glass wool, etc.

By incorporating the walls 110 with insulating materials between the zones 108a, 108b, the apparatus 100 can be more resilient to mechanical and thermal stress. Insulating materials can typically allow for an amount of compression and can therefore accommodate thermal expansion of each of the zones 108a, 108b. Insulating materials can also provide for improved mechanical flexibility.

Optionally, referring to FIG. 1B, an insulating layer 112 can be arranged between the zone 108b and the housing 102. The insulating layer 112 can minimize heat loss outwardly from the zone 108b and the housing 102 so that the zones 108a, 108b retain heat, further reducing the amount of time required to achieve operating temperatures at which efficient conversion takes place.

In use, the apparatus 100 can be implemented to reduce emissions from an internal combustion engine (not shown). In particular, the inlet 104 can be placed in fluid communication with an exhaust gas stream of the engine. The exhaust gas stream can be delivered to the zones 108a, 108b. The stream can be passed through the zones 108a, 108b thereby causing the stream to separate into a plurality of individual streams, each individual stream reacting with the catalytic material of the at least one substrate element to form a treated stream. The treated streams can be combined to form an outlet gas stream, and then expelled from the outlet 106.

The zones 108a, 108b can heat up generally independently of one another. Therefore, the apparatus 100 may exhibit enhanced conductive heating as compared with a unitary or monolithic substrate design, since thermal energy is transferred separately through the zones 108a, 108b. Furthermore, if the zone 108a heats more quickly than the zone 108b due to uneven heat distribution in the exhaust gas stream, e.g., hotter towards the middle of the stream, the higher temperature zone 108a may be able to reach light-off sooner to catalyze emissions, even though other substrate zones 108 have not reached the light-off temperature. Conversely, during idling, idle gases may cool zone 108a more quickly than zone 108b, so that the zone 108b retains heat and is able to recover more quickly from a period of idling.

There are three mechanisms of heat transfer between different parts of a conventional catalytic converter apparatus: (i) convection of hot gas inside the substrate; (ii) conduction through the substrate; and (iii) radiation from the substrate. For apparatus 100, the first two mechanisms, convection and conduction, can be obstructed by the introduction of the walls 110 (disregarding the connecting portions 114, which may allow for some minor heat transfer between the zones 108a, 108b). The third mechanism, radiation, can be highly dependent on temperature of the substrate, and can be a significant contributor only at high temperatures. For example, at 100° C., loss of heat due to radiation for a substrate material can be estimated to be about 1.4 kW/m$^2$s, while at 700° C., loss of heat due to radiation can be estimated to be about 57 kW/m$^2$s, an increase of a factor of 40. Therefore, introduction of the walls 110 between the zones 108a, 108b can impede heat transfer within the apparatus 100 at lower temperatures, whereas at higher temperatures, increasing participation of radiation can bypass the effect of the insulating materials and increase heat mobility between the zones 108a, 108b, preventing the zones 108a, 108b from overheating.

However, it should be appreciated that a single layer of insulation applied externally to the substrate zones (i.e. 112) cannot achieve the same effect as incorporating layers of the insulating material in walls 110 between the zones 108a, 108b. Solid mater is conductive, whereas most gases including air are poor conductors and good insulators. Most effective insulating materials are porous, and conductive heat transfer is largely reduced by the presence of the air-filled spaces (having low thermal conductivity) rather than by the material itself. As the temperature of the insulating material increases, its ability to conduct heat increases as well. Trapped air becomes a better conductor due to rapid movement of air molecules at higher temperatures. In addition, the solid part of the insulating material itself will start radiating more with an increase in temperature. Unlike insulation, the zones 108a, 108b can be generally solid and thus not subject to such substantial changes in thermal conductivity.

Consequently, it should be appreciated that as temperatures increase the insulating materials will exhibit a decreased effectiveness at impeding the mobility of heat within the apparatus 100, which can prevent the zones 108a, 108b from overheating. In contrast, a single, relatively thick layer of insulating material can increase the ability of a substrate zone to retain heat, and thus it can heat up faster, but it can also decrease its ability to lose heat at high temperature, which can lead to overheating.

As an example, the apparatus 100 can have a width dimension of about 12 cm and a height dimension of about 8 cm. The dimensions may vary depending on the application. The walls 110 and the insulating material therein separating the zones 108a, 108b can have a thickness, for example but not limited to, less than 10 mm, or between 0.1 and 5 mm, or between 0.5 and 2 mm. Thickness of the insulating material can be varied depending on the operating temperature (i.e. thinner for lower temperature) and properties of the insulating material. The insulating material in the walls 110 separating the zones 108a, 108b can be generally uniform in thickness.

End surfaces of the walls 110 can serve to obstruct axial gas flow, since at least a portion of the exhaust gas stream entering the inlet 104 must divert from its path to enter a respective one of the zones 108a, 108b. The diversion of at least a portion of the gas stream can create a pressure build up and increase turbulence of the gas flow at the ends of the zones 108a, 108b facing in the inlet 104. Increased turbulence can cause a corresponding increase in temperature of the gas stream, which can enhance the heating of the zones 108a, 108b and the rate at which operating temperatures are achieved.

However, in cases where an increase in backpressure is to be avoided, the sectional dimensions of the apparatus 100 in a direction orthogonal to gas flow can be decreased in an amount proportional to the amount of sectional area occupied by the walls 110. For example, referring to FIG. 1B, if the walls 110 constitute about 10% of the overall sectional area of the apparatus 100, then the dimensions of the apparatus 100 can be decreased by about 10% to offset the backpressure effect of the walls 110.

Figure 2A:
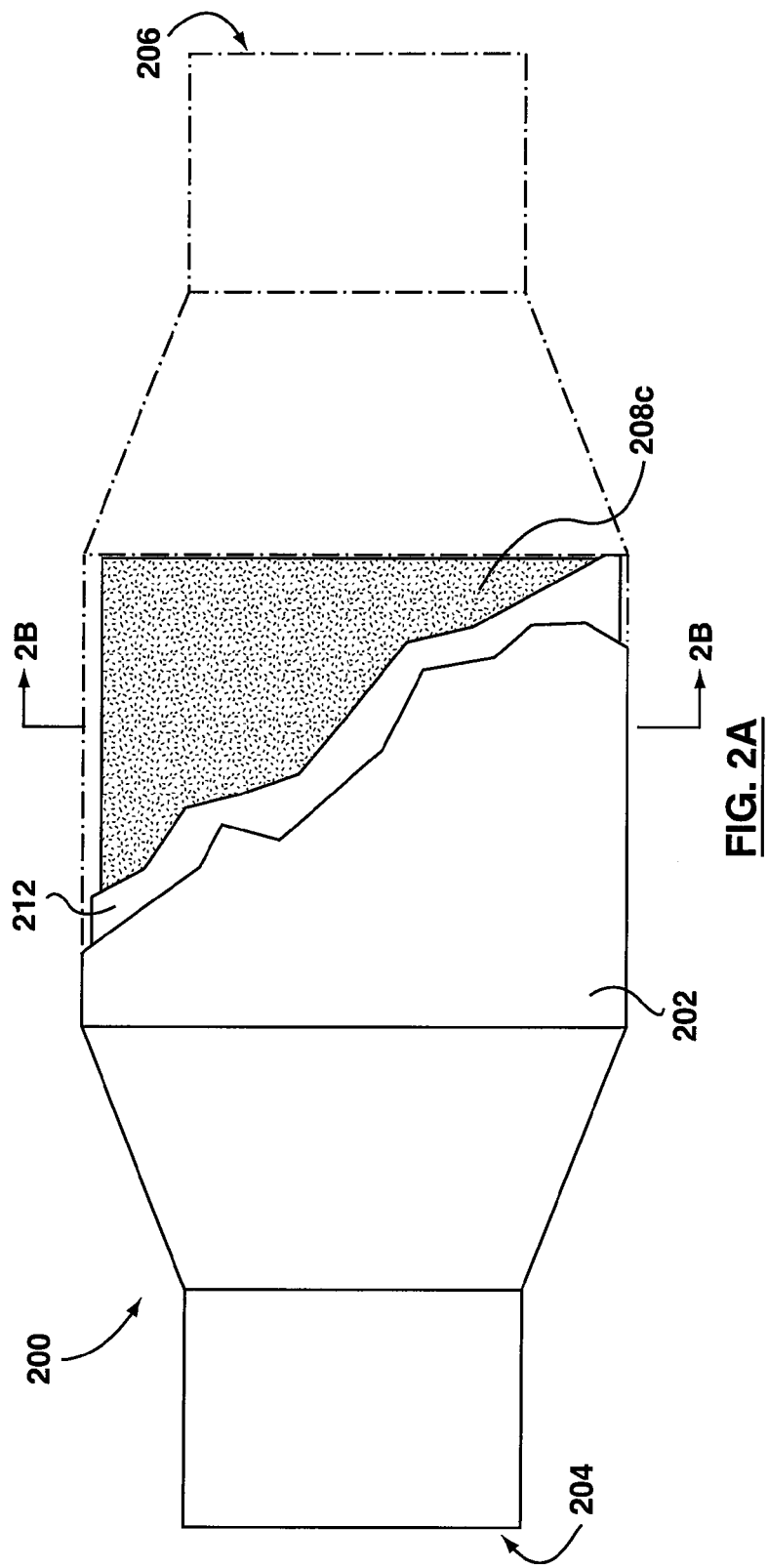
FIG. 2A is a side cutaway view of an apparatus.
Figure 2B:
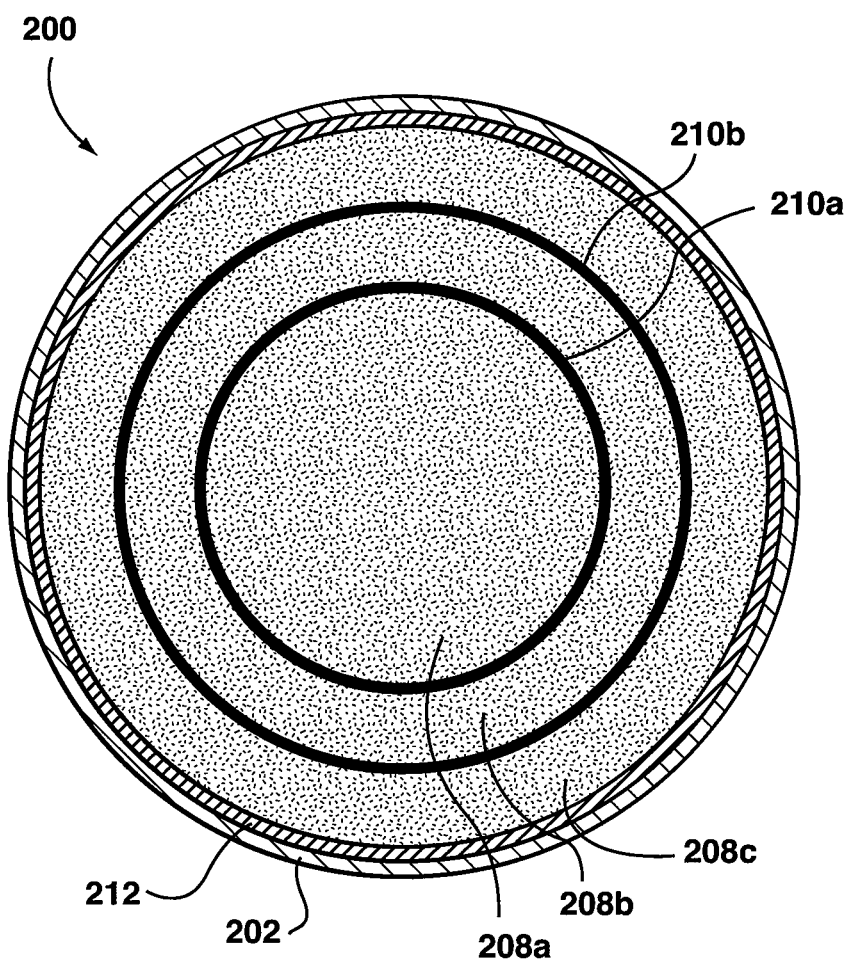
FIG. 2B is a sectional view of the apparatus of FIG. 2A.
Figure 2C:
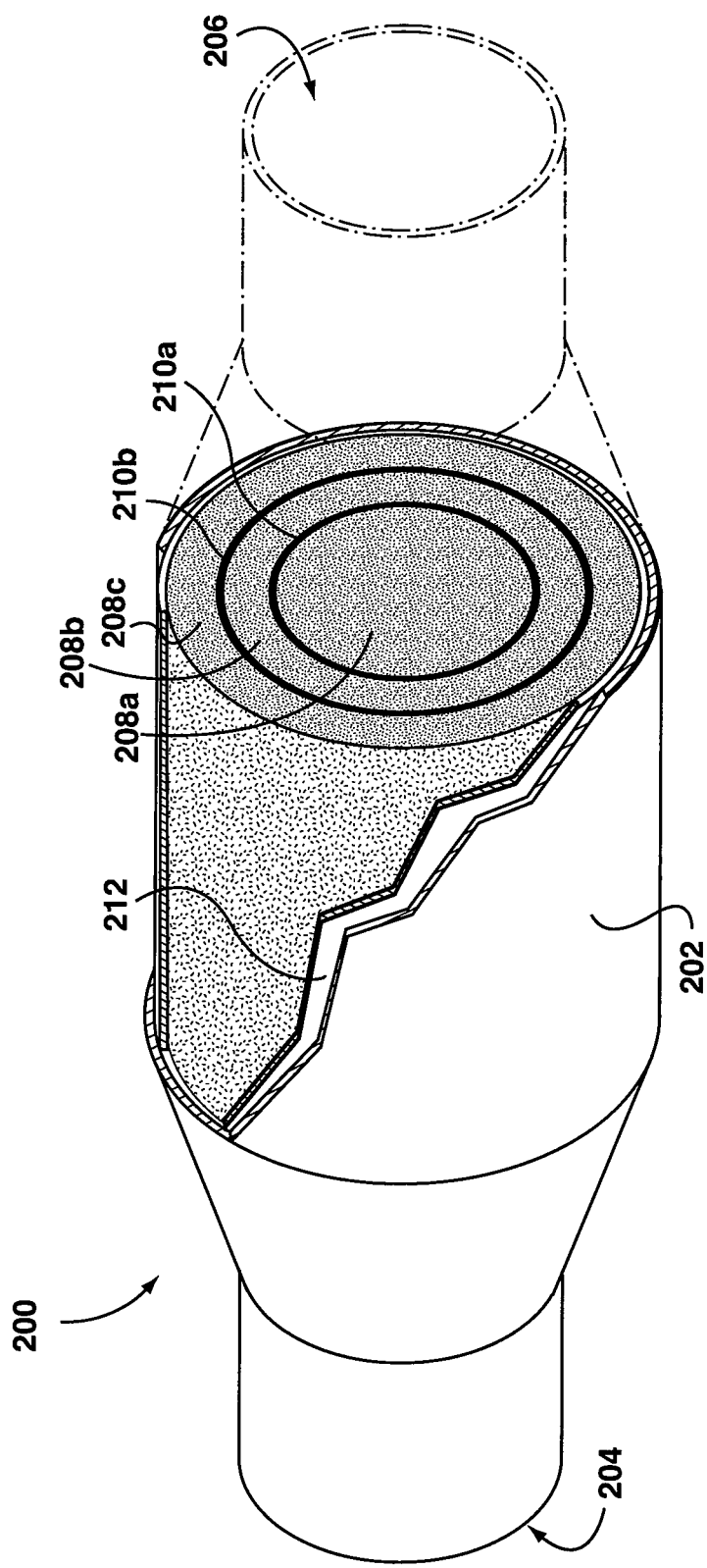
FIG. 2C is a perspective cutaway view of the apparatus of FIG. 2A.

Referring to FIGS. 2A, 2B and 2C, another example of a catalytic converter apparatus is shown generally at 200. The apparatus 200 is similar to apparatus 100, with like features identified by like reference numbers. The apparatus 200 includes a housing 202. The housing 202 can be roughly cylindrical, having a generally circular cross-sectional shape. The housing 202 includes a gas inlet 204, and a gas outlet 206 spaced apart from the inlet 204.

The apparatus 200 includes at least one substrate element 208 arranged in the housing 202. The substrate element 208 is divided or separated into zones or sections 208a, 208b, 208c. The zones 208a, 208b, 208c can be laterally or radially arranged with each defining a generally separate chamber or flow passage connecting the inlet 204 and the outlet 206 in fluid communication. The zones 208a, 208b, 208c can substantially fill the housing 202 in a radial dimension relative to an axis of gas flow from the inlet 204 to the outlet 206. The zones 208a, 208b can be at least partially separated by a wall 210a and the zones 208b, 208c can be at least partially separated by a wall 210b. Although not shown, the walls 210a, 210b can include connecting portions for providing structural support between the zones 208a, 208b, 208c (similar to the connecting portions 114 in the apparatus 100).

The zones 208a, 208b, 208c can be separated from one another by the walls 210a, 210b extending along substantially an entire length of the zones 208a, 208b, 208c in a direction extending from the inlet 204 to the outlet 206. The walls 210a, 210b can separate the zones 208a, 208b, 208c from one another so as to be generally impervious to gas flow between adjacent zones 208a, 208b, 208c.

The walls 210a, 210b can include insulating material to reduce heat mobility within the apparatus 200. In some examples, the walls 210a, 210b can be formed partially of insulating material and can also include some structure to separate the zones 208a, 208b, 208c and define separate flow passages (e.g., relatively thin solid ceramic or stainless steel material). In some other examples, the walls 210a, 210b can be formed entirely of insulating material.

The insulating material in the walls 210a, 210b can be generally uniform in thickness. Alternatively, the insulating material can be varied in thickness. For example, where there is a marked uneven heat distribution of the exhaust gas stream, e.g., the stream is hotter towards the middle, it may be desirable to more heavily insulate the zone 208c located around the periphery near the housing 202 than the zone 208a that is centrally located. Thus, wall 210b can be more heavily insulated than wall 210a.

By incorporating the walls 210a, 210b with insulating materials between the zones 208a, 208b, 208c, the apparatus 200 can be more resilient to mechanical and thermal stress. Insulating materials can typically allow for an amount of compression and can therefore accommodate thermal expansion of each of the zones 208a, 208b, 208c. Insulating materials can also provide for improved mechanical flexibility.

Optionally, referring to FIG. 2B, an insulating layer 212 can be arranged between the zone 208c and the housing 202. The insulating layer 212 can minimize heat loss outwardly from the zone 208c and the housing 202 so that the zones 208a, 208b, 208c retain heat, further reducing the amount of time required to achieve operating temperatures at which efficient conversion takes place.

The zones 208a, 208b, 208c can heat up generally independently of one another. Therefore, the apparatus 200 may exhibit enhanced conductive heating as compared with a unitary or monolithic substrate design, since thermal energy is transferred separately through the zones 208a, 208b, 208c. Furthermore, if the zone 208a heats more quickly than the zones 208b, 208c due to uneven heat distribution in the exhaust gas stream, e.g., hotter towards the middle of the stream, the higher temperature zone 208a may be able to reach light-off sooner to catalyze emissions, even though other zones 208b, 208c have not reached the light-off temperature. Conversely, during idling, idle gases may cool zone 208a more quickly than zones 208b, 208c, so that the zones 208b, 208c retain heat and are able to recover more quickly from a period of idling.

Optionally, the loading of catalytic material can be varied between the zones 208a, 208b, 208c. For example, it may be desirable to produce the apparatus 200 so that the loading of catalytic material in the central zone 208a is greater than that of zone 208b, and it may be further desirable to have the loading of catalytic material in zone 208b be greater than that of zone 208c. In such a configuration, a greater loading of catalytic material is provided to catalyze emissions in the centrally located zones, which are typically handling a greater flow of emissions than the peripherally located zones.

Also optionally, the catalytic surface area can be varied between the zones 208a, 208b, 208c. For example, it may be desirable to produce the apparatus 200 so that the catalytic surface area in the central zone 208a is greater than that of zone 208b, and it may be further desirable to have the catalytic surface area in zone 208b be greater than that of zone 208c. In such a configuration, a greater catalytic surface area is provided to catalyze emissions in the centrally located zones, which are typically handling a greater flow of emissions than the peripherally located zones.

Figure 3A:
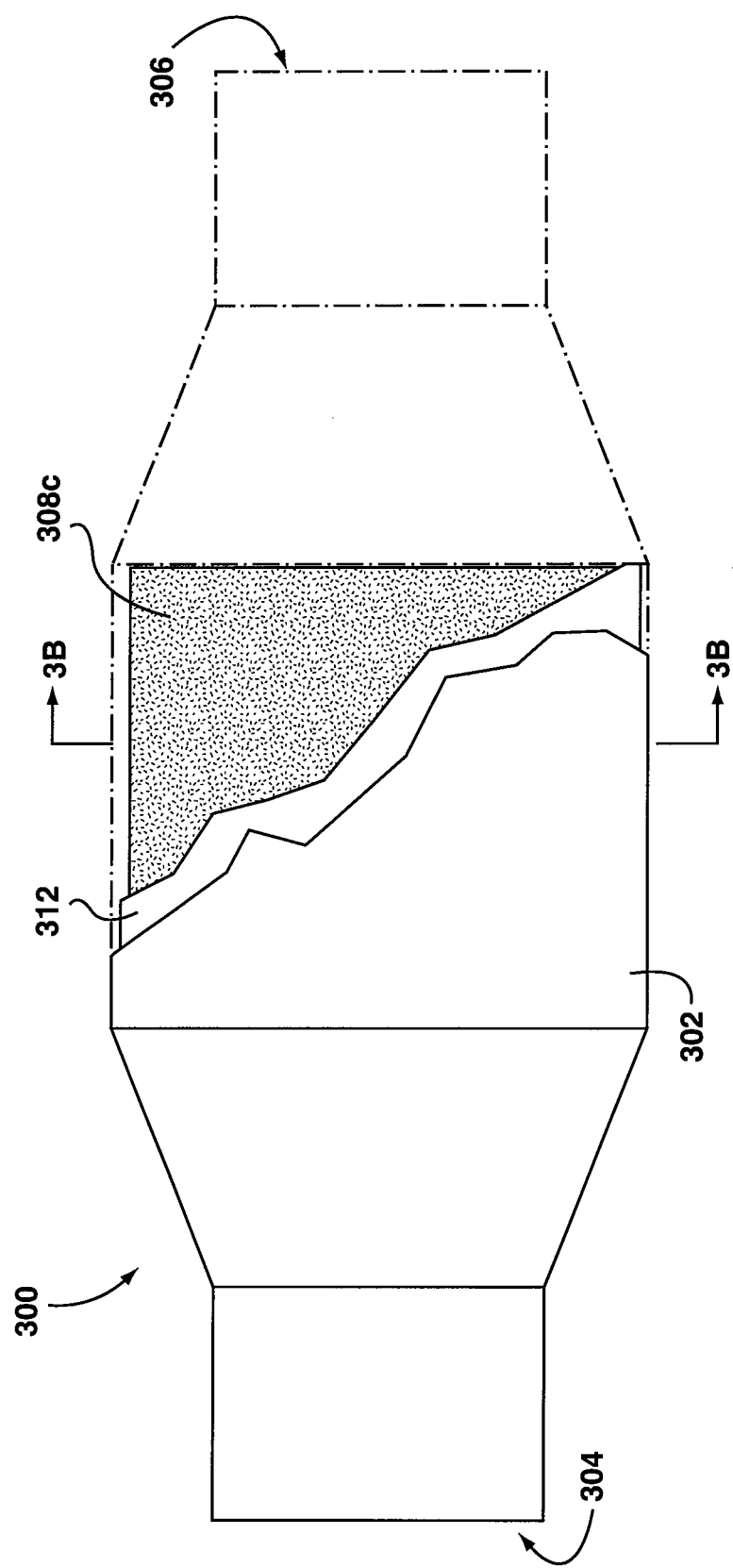
FIG. 3A is a side cutaway view of an apparatus.
Figure 3B:
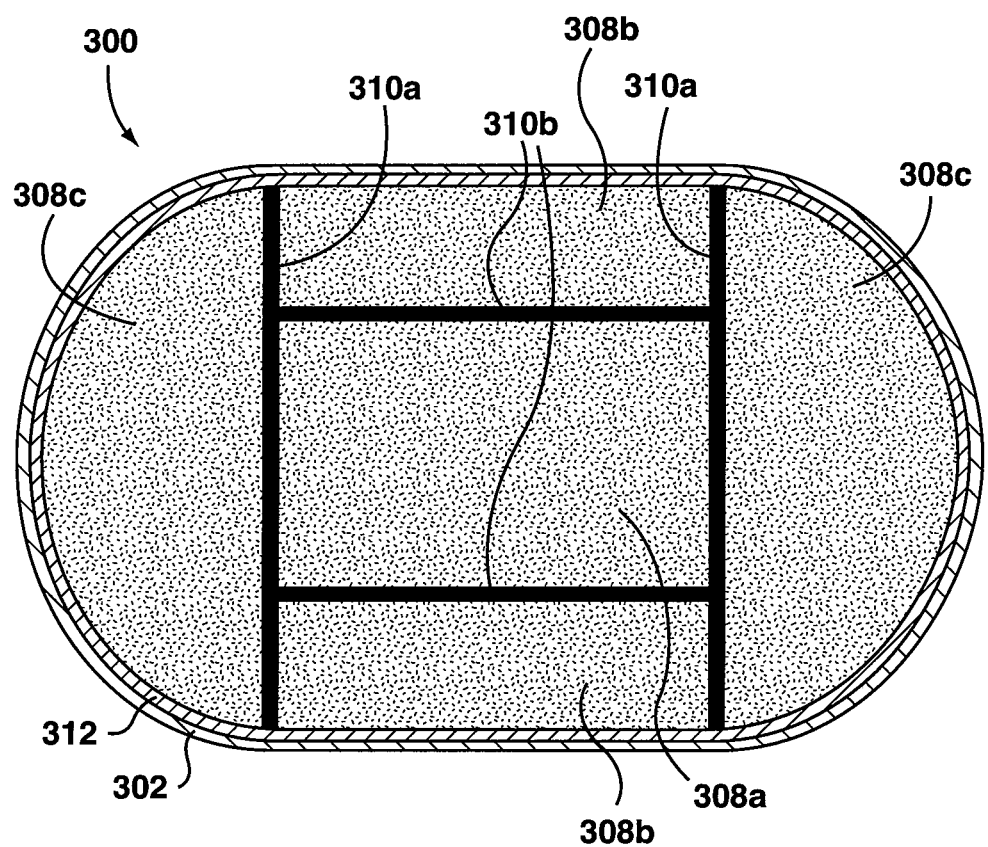
FIG. 3B is a sectional view of the apparatus of FIG. 3A.
Figure 3C:
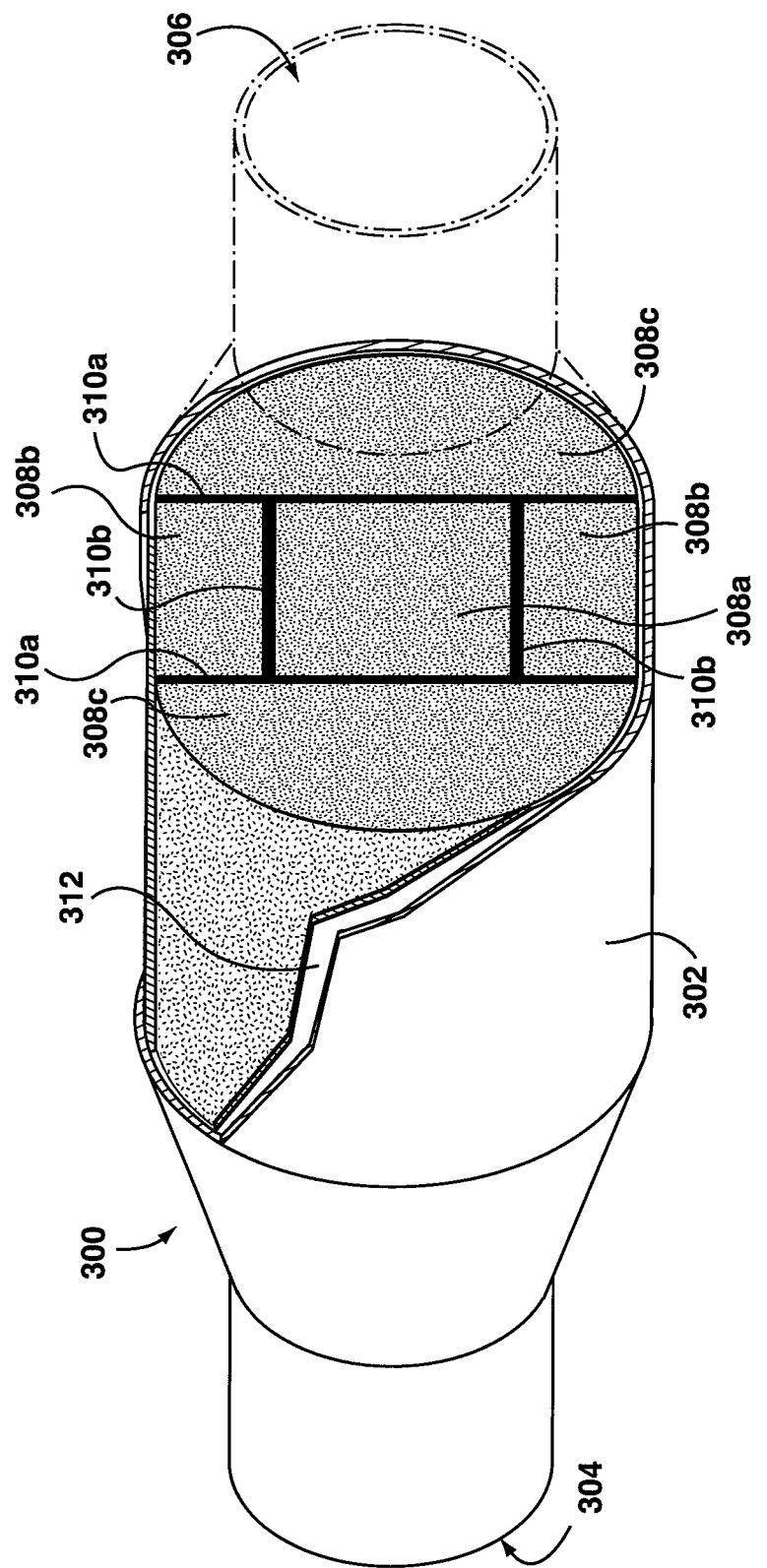
FIG. 3C is a perspective cutaway view of the apparatus of FIG. 3A.

Referring to FIGS. 3A, 3B and 3C, another example of a catalytic converter apparatus is shown generally at 300. The apparatus 300 is similar to apparatuses 100 and 200, with like features identified by like reference numbers. The apparatus 300 includes a housing 302. The housing 302 can be roughly cylindrical, having a generally oval cross-sectional shape. The housing 302 includes a gas inlet 304, and a gas outlet 306 spaced apart from the inlet 304.

The apparatus 300 includes at least one substrate element 308 arranged in the housing 302. The substrate element 308 is divided or separated into zones or sections 308a, 308b, 308c. The zones 308a, 308b, 308c can be laterally or arranged with each defining a generally separate chamber or flow passage connecting the inlet 304 and the outlet 306 in fluid communication. The zones 308a, 308b, 308c can substantially fill the housing 302 in a radial dimension relative to an axis of gas flow from the inlet 304 to the outlet 306.

Walls 310a, 310b at least partially separate zone 308a from zones 308b, 308c. The walls 310a, 310b can extend along substantially an entire length of the zones 308a, 308b, 308c in a direction extending from the inlet 304 to the outlet 306. The walls 310a, 310b can separate the zones 308a, 308b, 308c from one another so as to be generally impervious to gas flow between adjacent zones 308a, 308b, 308c.

The walls 310a, 310b can include insulating material to reduce heat mobility within the apparatus 300. In some examples, the walls 310a, 310b can be formed partially of insulating material and can also include some structure to separate the zones 308a, 308b, 308c and define separate flow passages (e.g., relatively thin solid ceramic or stainless steel material). In some other examples, the walls 310a, 310b can be formed entirely of insulating material.

By incorporating the walls 310a, 310b with insulating materials between the zones 308a, 308b, 308c, the apparatus 300 can be more resilient to mechanical and thermal stress. Insulating materials can typically allow for an amount of compression and can therefore accommodate thermal expansion of each of the zones 308a, 308b, 308c. Insulating materials can also provide for improved mechanical flexibility.

Optionally, referring to FIG. 3B, an insulating layer 312 can be arranged between the zones 308b, 308c and the housing 302. The insulating layer 312 can minimize heat loss outwardly from the zone 308c and the housing 302 so that the zones 308a, 308b, 308c retain heat, further reducing the amount of time required to achieve operating temperatures at which efficient conversion takes place.

The zones 308a, 308b, 308c can heat up generally independently of one another. Therefore, the apparatus 300 may exhibit enhanced conductive heating as compared with a unitary or monolithic substrate design, since thermal energy is transferred separately through the zones 308a, 308b, 308c. Furthermore, if the zone 308a heats more quickly than the zones 308b, 308c due to uneven heat distribution in the exhaust gas stream, e.g., hotter towards the middle of the stream, the higher temperature zone 308a may be able to reach light-off sooner to catalyze emissions, even though other zones 308b, 308c have not reached the light-off temperature. Conversely, during idling, idle gases may cool zone 308a more quickly than zones 308b, 308c, so that the zones 308b, 308c retain heat and are able to recover more quickly from a period of idling.

Similar to what was described for apparatus 200, the loading of catalytic material can be varied between the zones 308a, 308b, 308c. For example, the apparatus 300 can be prepared so that the loading of catalytic material in the central zone 308a is greater than that of zone 308b, and the loading of catalytic material in zone 308b is greater than that of zone 308c.

Figure 4A:
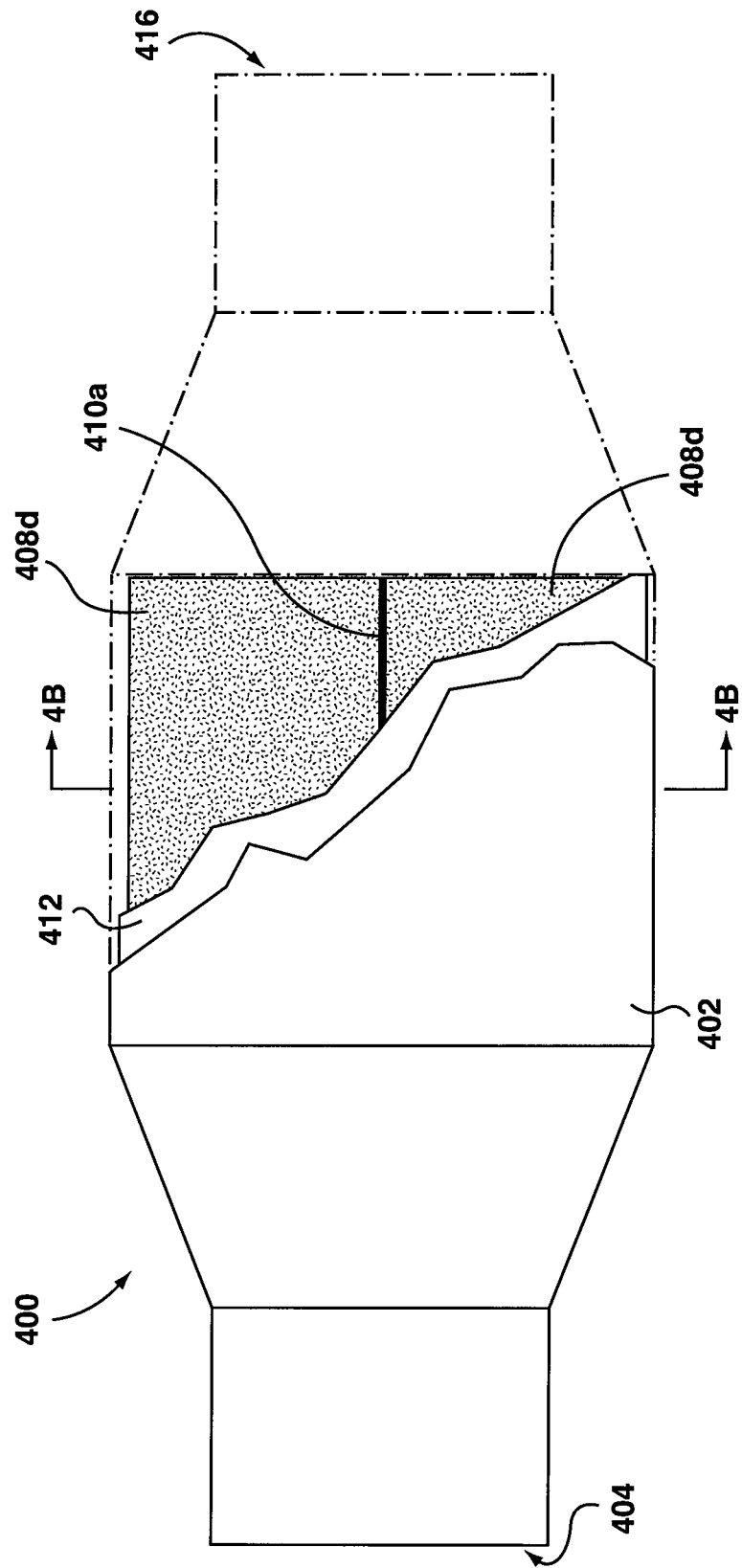
FIG. 4A is a side cutaway view of an apparatus.
Figure 4B:
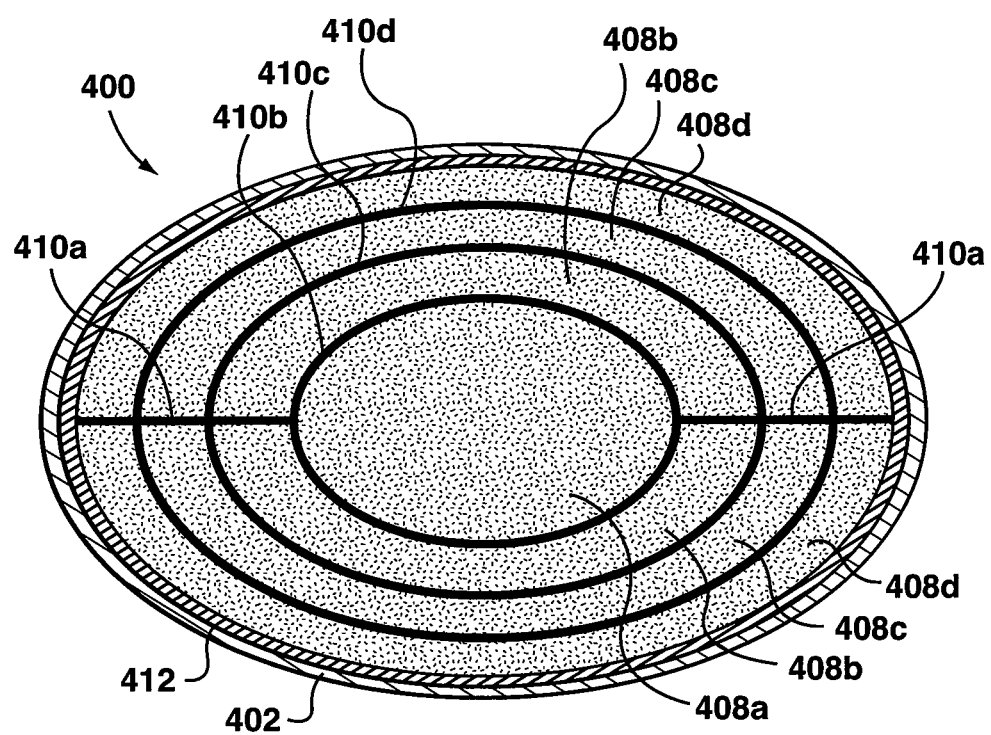
FIG. 4B is a sectional view of the apparatus of FIG. 4A.
Figure 4C:
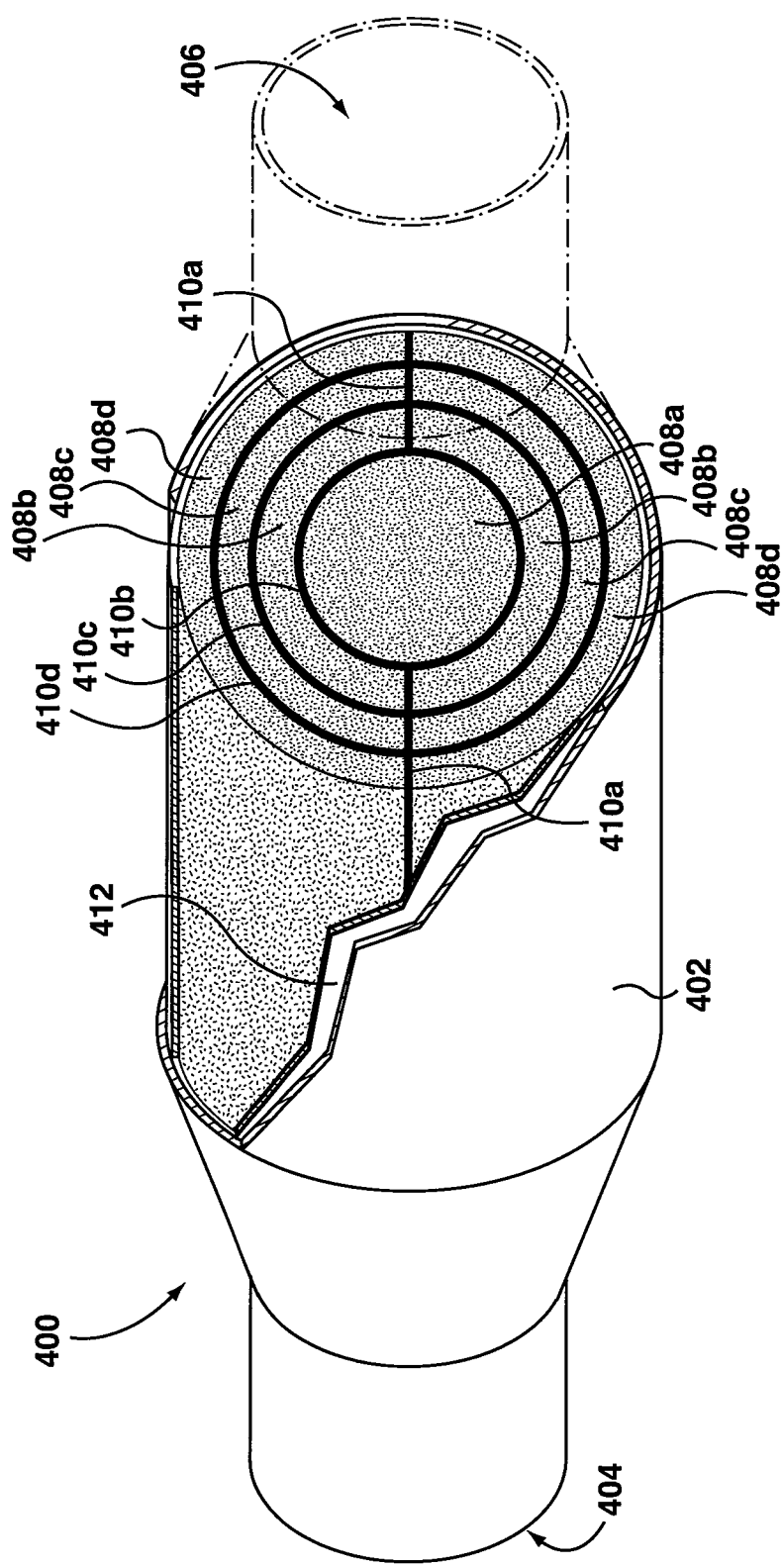
FIG. 4C is a perspective cutaway view of the apparatus of FIG. 4A.

Referring to FIGS. 4A, 4B and 4C, another example of a catalytic converter apparatus is shown generally at 400. The apparatus 400 is similar to apparatuses 100, 200 and 300, with like features identified by like reference numbers. The apparatus 400 includes a housing 402. The housing 402 can be roughly cylindrical, having a generally elliptical cross-sectional shape. The housing 402 includes a gas inlet 404, and a gas outlet 406 spaced apart from the inlet 404.

The apparatus 400 includes at least one substrate element 408 arranged in the housing 402. The substrate element 408 is divided or separated into zones or sections 408a, 408c, 408d. The zones 408a, 408b, 408c, 408d can be laterally arranged with each defining a generally separate chamber or flow passage connecting the inlet 404 and the outlet 406 in fluid communication. The zones 408a, 408b, 408b, 408d can substantially fill the housing 402 in a radial dimension relative to an axis of gas flow from the inlet 404 to the outlet 406.

Walls 410a, 410b, 410c, 410d at least partially separate the zones 408a, 408b, 408c, 408d. The walls 410a, 410b, 410c, 410d can extend along substantially an entire length of the zones 408a, 408b, 408c, 408d in a direction extending from the inlet 404 to the outlet 406. The walls 410a, 410b, 410c, 410d can separate the zones 408a, 408b, 408c, 408d from one another so as to be generally impervious to gas flow between adjacent zones 408a, 408b, 408c, 408d.

The walls 410a, 410b, 410c, 410d can include insulating material to reduce heat mobility within the apparatus 400. In some examples, the walls 410a, 410b, 410c, 410d can be formed partially of insulating material and can also include some structure to separate the zones 408a, 408b, 408c, 408d and define separate flow passages (e.g., relatively thin solid ceramic or stainless steel material). In some other examples, the walls 410a, 410b, 410c, 410d can be formed entirely of insulating material.

By incorporating the walls 410a, 410b, 410c, 410d with insulating materials between the zones 408a, 408b, 408c, 408d, the apparatus 400 can be more resilient to mechanical and thermal stress. Insulating materials can typically allow for an amount of compression and can therefore accommodate thermal expansion of each of the zones 408a, 408b, 408c, 408d. Insulating materials can also provide for improved mechanical flexibility.

Optionally, referring to FIG. 4B, an insulating layer 412 can be arranged between the zones 408d and the housing 402. The insulating layer 412 can minimize heat loss outwardly from the zone 408c and the housing 402 so that the zones 408a, 408b, 408c, 408d retain heat, further reducing the amount of time required to achieve operating temperatures at which efficient conversion takes place.

The zones 408a, 408b, 408c, 408d can heat up generally independently of one another. Therefore, the apparatus 400 may exhibit enhanced conductive heating as compared with a unitary or monolithic substrate design, since thermal energy is transferred separately through the zones 408a, 408b, 408c, 408d. Furthermore, if the zone 408a heats more quickly than the zones 408b, 408c, 408d due to uneven heat distribution in the exhaust gas stream, e.g., hotter towards the middle of the stream, the higher temperature zone 408a may be able to reach light-off sooner to catalyze emissions, even though other zones 408b, 408c, 408d have not reached the light-off temperature. Conversely, during idling, idle gases may cool zone 408a more quickly than zones 408b, 408c, 408d so that the zones 408b, 408c, 408d retain heat and are able to recover more quickly from a period of idling.

The average thermal conductivity of the combination of zones 408a, 408b, 408c, 408d and walls 410a, 410b, 410c, 410d can be determined by the length of the path traveled through each of the constituents. Therefore, for some particular examples, it is effective to position the walls in generally parallel layers corresponding with the overall cross-sectional shape of the housing. As illustrated, and with particular reference to FIG. 4B, with a housing 402 having an elliptical cross-sectional shape, the apparatus 400 can comprise a central zone 408a, and concentrically arranged radial zones 408b, 408c, 408d. The walls 410a, 410b, 410c, 410d are concentric and are roughly in parallel with the shape of the housing 402. This configuration can minimize the number of zones and the amount of insulating materials used in the walls. Furthermore, the radially extending walls 410a can be included to separate each of the radial zones 408b, 408c, 408d into roughly complementary half portions, which can simplify assembly of the apparatus 400.

Figure 5A:
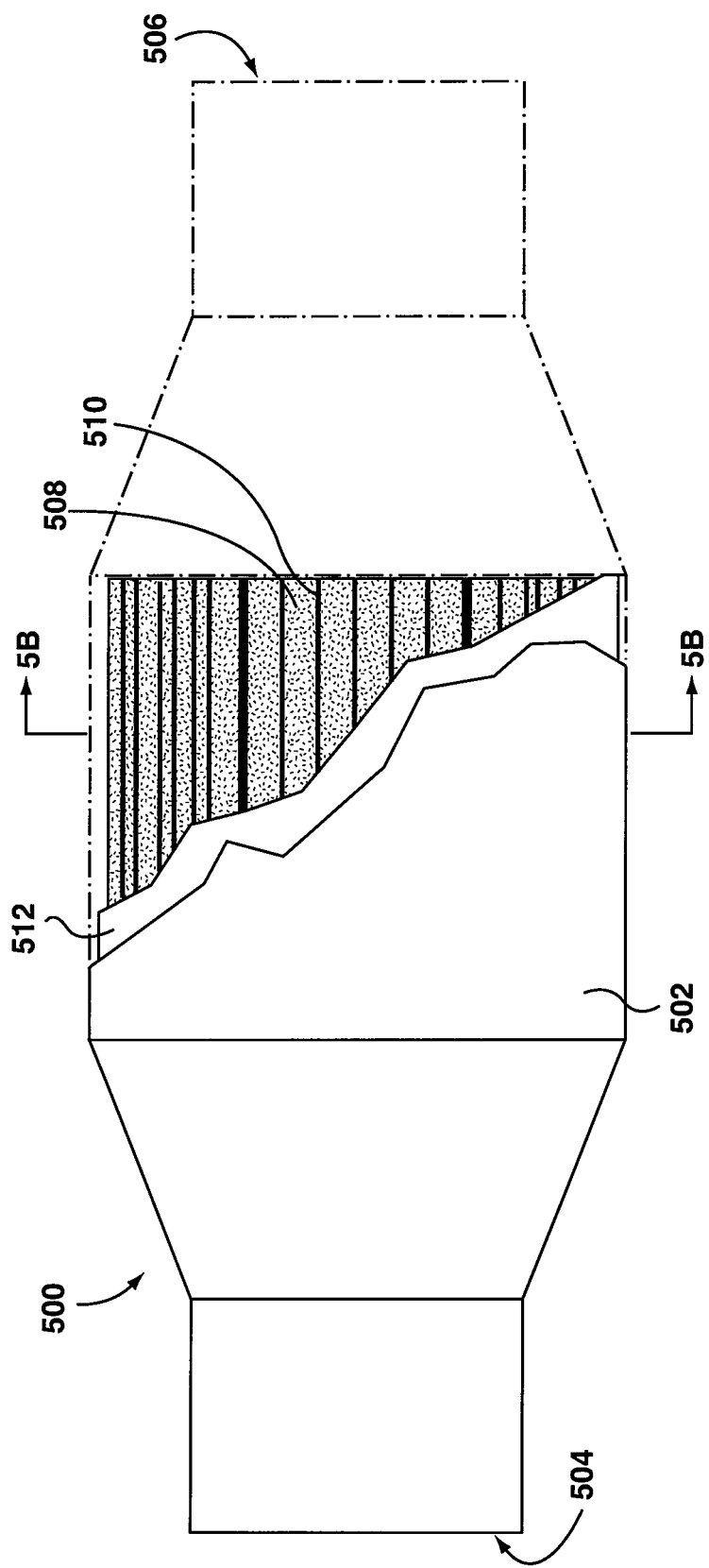
FIG. 5A is a side cutaway view of an apparatus.
Figure 5B:
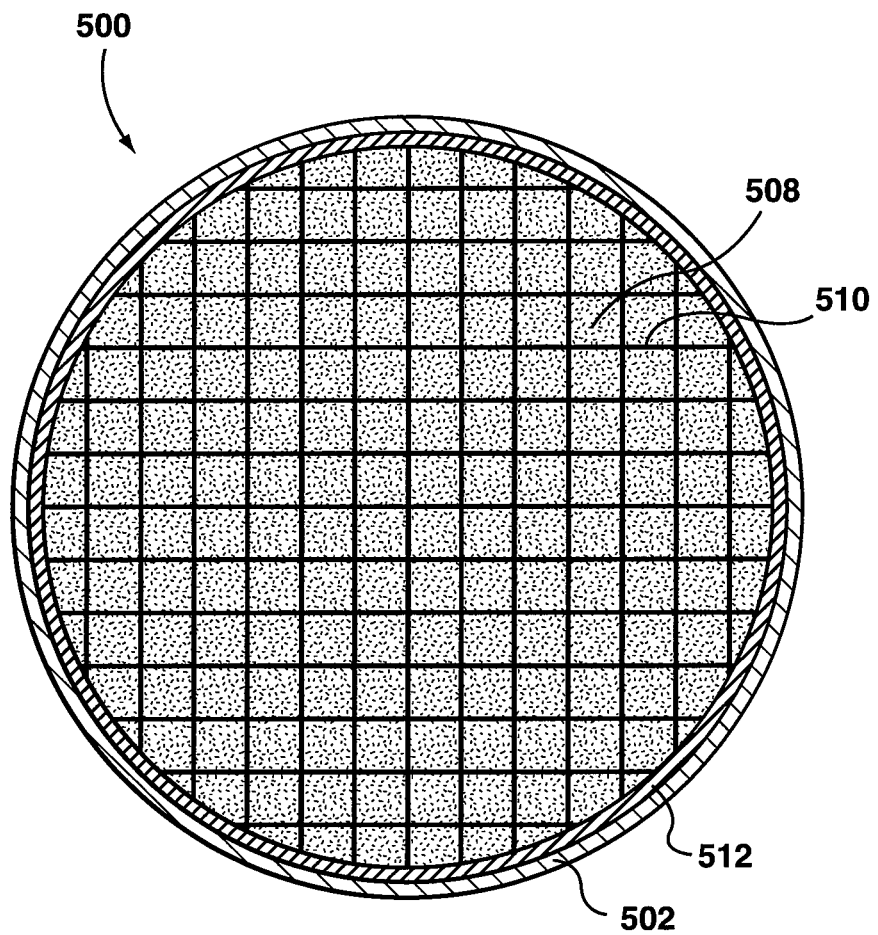
FIG. 5B is a sectional view of the apparatus of FIG. 5A.
Figure 5C:
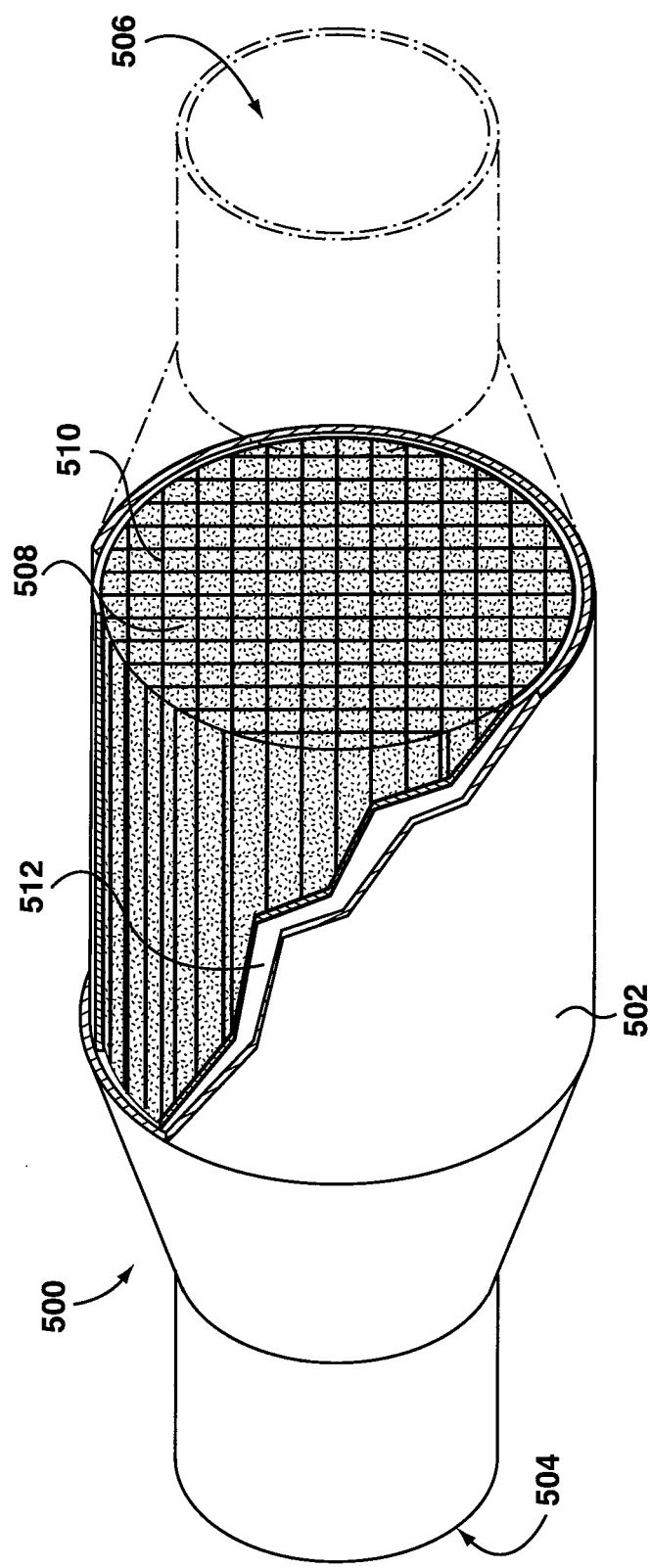
FIG. 5C is a perspective cutaway view of the apparatus of FIG. 5A.

Referring to FIGS. 5A, 5B and 5C, another example of a catalytic converter apparatus is shown generally at 500. The apparatus 500 is similar to apparatuses 100, 200, 300 and 400, with like features identified by like reference numbers. The apparatus 500 includes a housing 502. The housing 502 can be, for example but not limited to, roughly cylindrical, having a circular cross-sectional shape. The housing 502 includes a gas inlet 504, and a gas outlet 506 spaced apart from the inlet 504.

The apparatus 500 includes at least one substrate element arranged in the housing 502 and divided or separated into a plurality of zones or sections 508. Each of the zones 508 can consist of a unitary substrate element. The zones 508 can be laterally arranged with each defining a generally separate chamber or flow passage connecting the inlet 504 and the outlet 506 in fluid communication. The zones 508 can substantially fill the housing 502 in a radial dimension relative to an axis of gas flow from the inlet 504 to the outlet 506. In some examples, the apparatus 500 can include at least twenty five substrate zones 508. In some examples, the apparatus 500 can include at least one hundred substrate zones 508.

Walls 510 at least partially separate the zones 508. The walls 510 can extend along substantially an entire length of the zones 508, in a direction extending from the inlet 504 to the outlet 506. The walls 510 can separate the zones 508 from one another so as to be generally impervious to gas flow between adjacent zones 508.

The walls 510 can include insulating material to reduce heat mobility within the apparatus 500. In some examples, the walls 510 can be formed partially of insulating material and can also include some structure to separate the zones 508 and define separate flow passages (e.g., relatively thin solid ceramic or stainless steel material). In some other examples, the walls 510 can be formed entirely of insulating material.

By incorporating the walls 510 with insulating materials between the zones 508, the apparatus 500 can be more resilient to mechanical and thermal stress. Insulating materials can typically allow for an amount of compression and can therefore accommodate thermal expansion of each of the zones 508. Insulating materials can also provide for improved mechanical flexibility.

Optionally, referring to FIG. 5B, an insulating layer 512 can be arranged between the zones 508 and the housing 502. The insulating layer 512 can minimize heat loss outwardly from the zones 508 and the housing 502 so that the zones 508 retain heat, further reducing the amount of time required to achieve operating temperatures at which efficient conversion takes place.

The zones 508 can heat up generally independently of one another. Therefore, the apparatus 500 may exhibit enhanced conductive heating as compared with a unitary or monolithic substrate design, since thermal energy is transferred separately through the zones 508.

Referring to FIGS. 6, 7, 8 and 9, the number, dimension and shape of each of the zones can vary, and can be optimized for a given exhaust system. Example apparatuses 600, 700, 800 and 900 are similar to apparatuses 100, 200, 300, 400 and 500, with like features identified by like reference numbers.

In some examples, each of the zones can be of like cross-sectional shape in a plane orthogonal to a direction of gas flow, with the shape selected from squares (see FIG. 5B), triangles (see FIG. 6), circles (see FIG. 7), hexagons (see FIG. 8), rectangles (FIG. 9), trapezoids, etc. Other shapes and various combinations thereof of the zones and the housing are possible.

Figure 6:
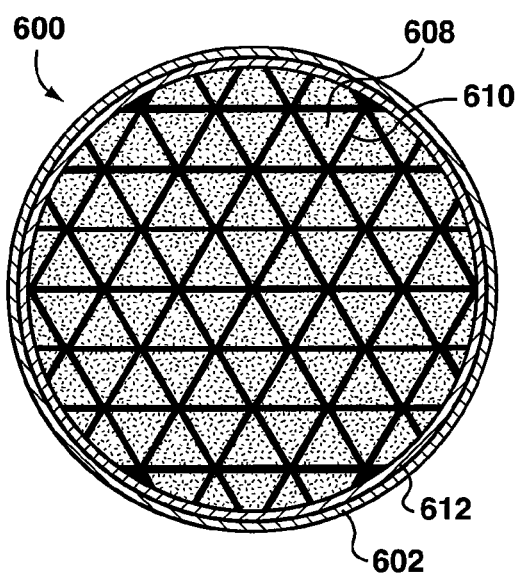
FIGS. 6 to 9 are sectional views of other apparatuses.
Figure 7:
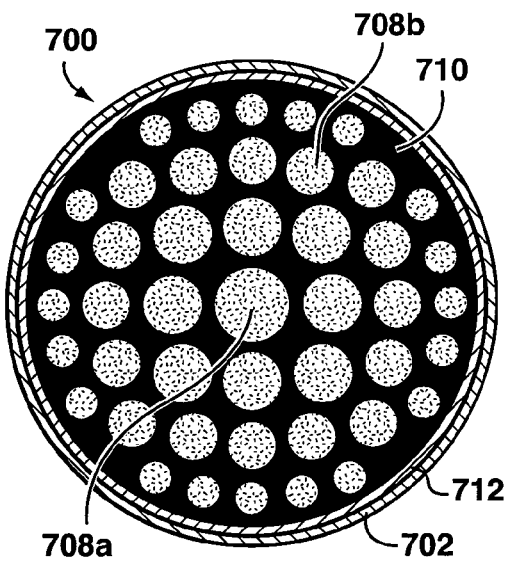
Figure 8:
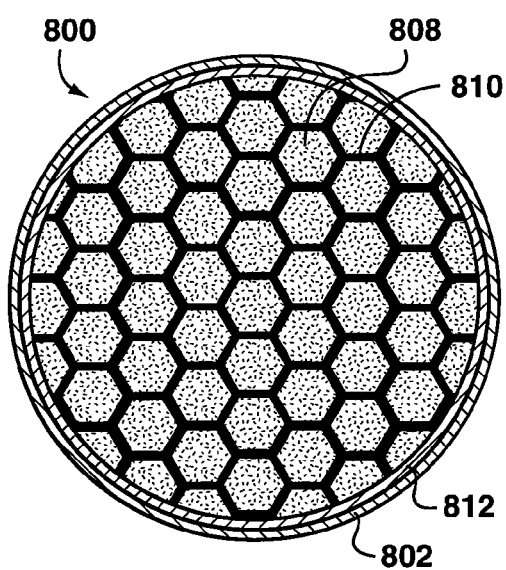
Figure 9:
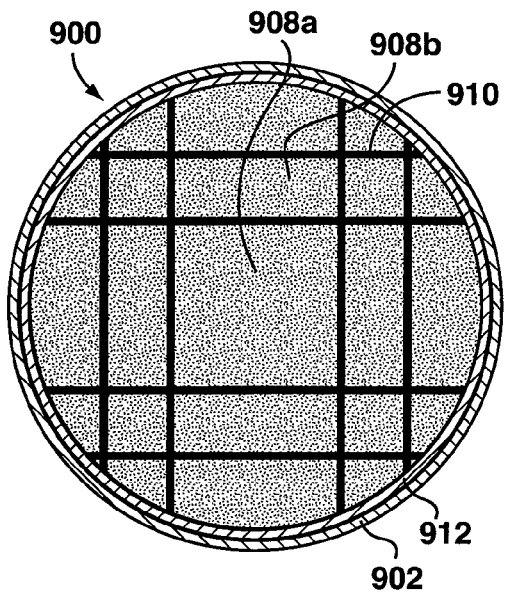

As illustrated in FIGS. 5B, 6 and 8, the cross-sectional areas of the zones 508, 608, 808 in a plane orthogonal to a direction of gas flow can be generally uniform. However, referring to FIGS. 1B, 2B, 3B, 4B, 7 and 9, the cross-sectional areas of the zones 108, 208, 308, 408, 708 and 908 in a plane orthogonal to a direction of gas flow can be varied. For example, referring to FIGS. 7 and 9, zones 708a, 908a centrally located can have a larger cross-sectional area than zones 708b, 908b peripherally located. This may be desirable, for example, where there is a marked uneven heat distribution of the exhaust gas stream, e.g., the stream is hotter towards the middle, and the heating enhancement provided by the plurality of zones 708, 908 is more critical in areas around the periphery near the housing 702, 902.

The apparatuses disclosed herein can be designed and produced to be of similar dimensions to conventional catalytic converters, and thus installable with existing exhaust systems as a retrofit. Various geometries are possible so that the apparatus disclosed herein are compatible with a variety of gasoline or diesel internal combustion engines, and can be used in the exhaust systems of a variety of motor vehicles, for example but not limited to, automobiles, light trucks, heavy trucks, buses, tractors, forklifts and other industrial machinery, motorcycles, etc.

Reference is now made to the following examples, which are intended to be illustrative but non-limiting.

EXAMPLE 1

Testing using prototype catalytic converter apparatuses was conducted. A commercially available catalytic converter (made by Applied Ceramics, Inc. of Atlanta, Ga.) was provided with dimensions of 3.15×4.75×2.5 inches, and with a precious metal loading of 20 g/cf. Three prototype catalytic converter apparatuses were prepared generally to resemble the example apparatus 100. Prototype 1 had dimensions of 3.15×4.75×2.25 inches, and a precious metal loading of 20 g/cf. Prototype 2 had dimensions of 3.15×4.75×2.25 inches, and a precious metal loading of 17 g/cf. Prototype 3 had dimensions of 3.15×4.75×2.25 inches, and a precious metal loading of 14 g/cf. Each prototype included FIBERFRAX LDS MOLDABLE™ materials as the wall separating zones of the substrate element, with a thickness of about 0.16 cm.

A 2009 TOYOTA COROLLA™ vehicle was equipped with the commercial catalytic converter and the prototype apparatuses. Third party independent testing was conducted in accordance with the United States Environmental Protection Agency's US06 testing procedure. The vehicle was subjected to the driving cycle and emissions for each of the cold start, transition and warm start phases were collected, and average emissions were measured. The emission results are provided below in Table 1. The testing demonstrated good results for the prototype apparatuses, even with reduced precious metal loadings.

TABLE 1

Average emission results.

| | Emissions by type (grams per mile) | | |
|---|---|---|---|
| | CO | NOx | HC |
| Commercial | 2.623 | 0.608 | 0.065 |
| Prototype 1 | 1.344 | 0.520 | 0.064 |
| Prototype 2 | 1.533 | 0.394 | 0.058 |
| Prototype 3 | 1.816 | 0.578 | 0.068 |

EXAMPLE 2

Testing using a prototype catalytic converter apparatus was conducted. Two aftermarket catalytic converters (MAGNAFLOW™ OBD-II Catalytic Converter, MagnaFlow Performance Exhaust of Rancho Santa Margarita, Calif.) were provided, each with a two-stage substrate approximately 100 mm long and 125×80 mm oval/ice rink shape. One of the converters was altered to resemble example apparatus 500.

To prepare the prototype apparatus, the substrate element was removed from the housing and sliced longitudinally into a plurality of zones or sections, each zone having approximately 10 mm by 10 mm square cross-section in a plane orthogonal to a direction of gas flow. Each zone was wrapped with FIBERFRAX LDS MOLDABLE™ insulating material. The wrapped zones were then bundled together and wrapped with an additional FIBERFRAX™ insulating layer, and inserted back into the housing. The thickness of the insulating material separating each zone from an adjacent zone was roughly 1 mm. The original steel housing was used, so some of the volume of the zones (roughly 10-15%) had to be removed to account for the thickness of the insulating material, resulting in reduced overall performance due to smaller amount of catalytic material.

Figure 10:
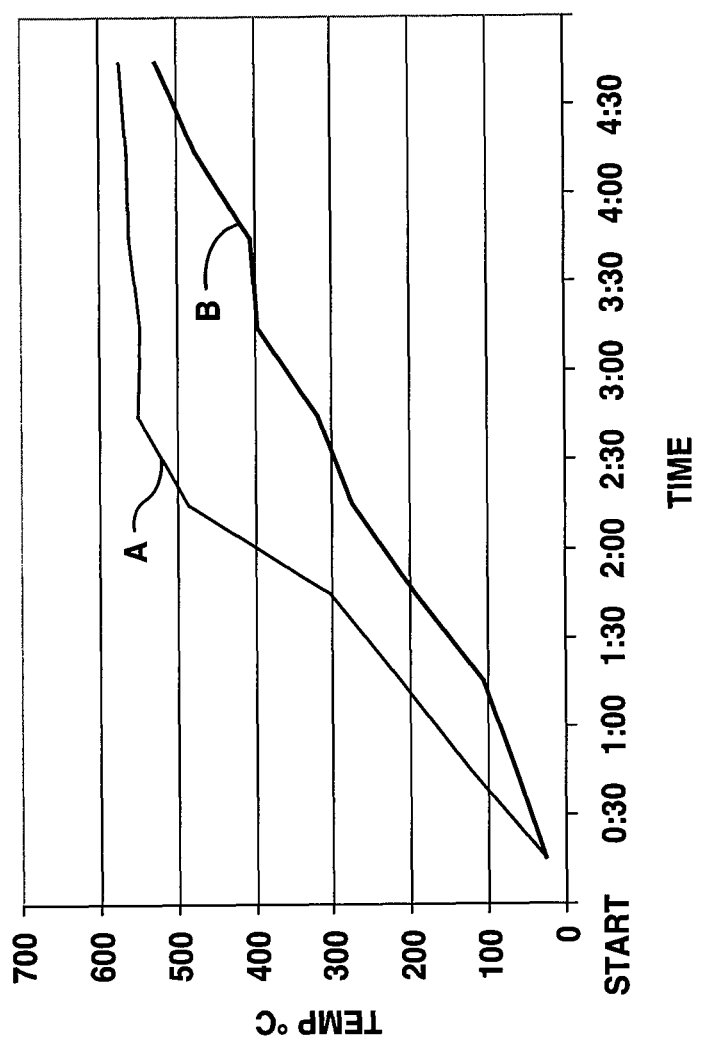
FIG. 10 is a graph showing testing results.

A 1986 GMC C3500 SIERRA™ vehicle was equipped with the regular catalytic converter and with the prototype apparatus. Both catalytic converters were fitted with a thermocouple in a central position within the housing to measure the internal temperature. The vehicle was started from a cold start. The engine was accelerated on a dynamometer and kept at a constant speed of 40 km/h to maintain about 2,000 rpm for the duration of the test procedure. Referring to FIG. 10, the prototype apparatus, denoted by curve line "A", exhibited a reduced heat up time in comparison to the regular catalytic converter, denoted by line "B".

Emission measurements were performed at an Ontario Drive Clean Program certified facility. The vehicle was subjected a standard test using both a standard catalytic converter and the prototype apparatus. The vehicle was kept idling for approximately 10 minutes, and then emissions were recorded for 40 km/h speeds using a dynamometer and curb idle speeds. The emission results are provided in Table 2 below. Relatively poor hydrocarbon and carbon monoxide results suggest that the temperature measuring probes may have significantly damaged the catalytic materials, especially the oxidizing portions of the substrates.

TABLE 2

Emission results for a prototype using a standard emissions test

| | Commercial | | Prototype | |
|---|---|---|---|---|
| Emissions type | 40 km/h | Curb idle | 40 km/h | Curb idle |
| hydrocarbons (ppm) | 60 | 54 | 81 | 107 |
| carbon monoxide (%) | 0.04 | 0.00 | 0.15 | 0.03 |
| NO (ppm) | 1386 | N/A | 936 | N/A |

Figure 11:
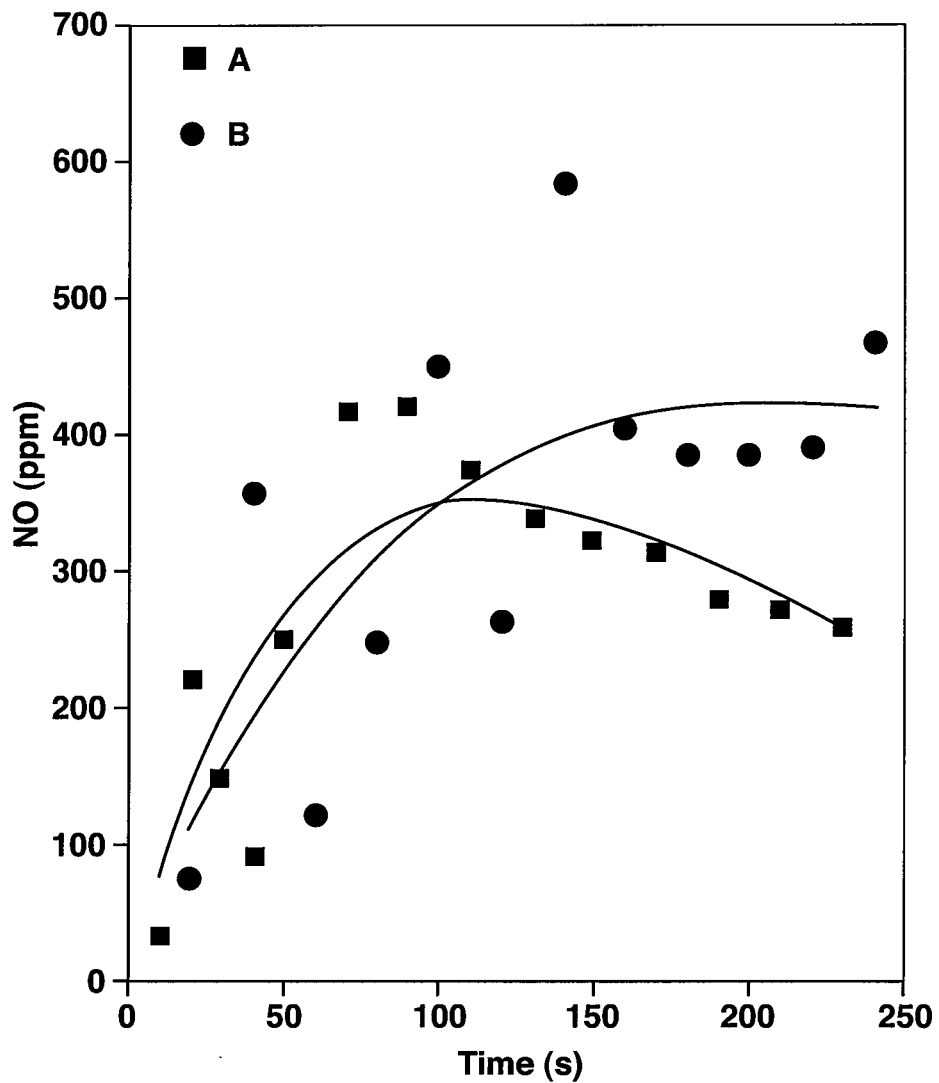
FIG. 11 is another graph showing testing results.

Referring to new FIG. 11, the vehicle was also subjected to a real-time emissions test. Emissions were recorded every 10 to 15 seconds over a 4 minute period. Although there is data scatter, the prototype apparatus appears to achieve operating temperature sooner than the standard, non-modified catalytic converter. Note that ambient temperature during this test was relatively low (about 5° C.), resulting in relatively slow heat up times for both catalytic converters.

EXAMPLE 3

Another prototype catalytic converter was prepared by modifying a standard catalytic converter from a VOLKSWAGEN JETTA™. The catalytic converter was altered to resemble example apparatus 500. To prepare the prototype apparatus, the standard catalytic converter was disassembled by cutting the stainless steel housing, removing the monolithic substrate element, and slicing the substrate longitudinally into a plurality of zones or sections, each zone having approximately 10 mm by 10 mm square cross-section in a plane orthogonal to a direction of gas flow. FIBERFRAX LDS MOLDABLE™ material was applied in relatively thin layers to surfaces of each of the zones. The zones were reassembled in a steel housing having a slightly larger size than that of the original, thus allowing for the thickness of the insulating material so that no removal of catalytic material was required. The thickness of the insulating material separating each zone from an adjacent zone was roughly 2 mm.

Emission measurements were performed at an Ontario Drive Clean Program certified facility. A 2001 VOLKSWAGEN JETTA™ vehicle was subjected a standard test using both a standard catalytic converter and the prototype apparatus. The vehicle was kept idling for approximately 5 to 10 minutes, and then emissions were recorded for 40 km/h speeds using a dynamometer and curb idle speeds. The emission results are provided in Table 3 below.

TABLE 3

Emission results using a standard emissions test

| | Standard | | Prototype | |
|---|---|---|---|---|
| Emissions type | 40 km/h | Curb idle | 40 km/h | Curb idle |
| hydrocarbons (ppm) | 17 | 17 | 7 | 5 |
| carbon monoxide (%) | 0.00 | 0.01 | 0.03 | 0.00 |
| NO (ppm) | 41 | N/A | 0 | N/A |

EXAMPLE 4

Two MAGNAFLOW™ 94306 catalytic converters were provided. One of the converters was altered to generally resemble example apparatus 500. To prepare the prototype apparatus, the substrate element was removed from the housing and sliced longitudinally into a plurality of zones or sections, each zone having approximately 10 mm by 10 mm square cross-section in a plane orthogonal to a direction of gas flow. Each zone was insulated with a combination of FIBER-FRAX XFP™ paper and FIBERFRAX LDS MOLDABLE™ cement materials. The FIBERFRAX XFP™ paper was the primary insulator, while the FIBERFRAX LDS MOLDABLE™ cement was applied in a thin layer to glue the zones and the FIBERFRAX XFP™ paper together. The zones were bundled together and inserted back into the housing. The original steel housing was used, so some of the volume of the zones (roughly 10-15%) was removed to account for the thickness of the insulating material, resulting in reduced overall performance due to smaller amount of catalytic material. The thickness of the insulating material separating each zone from an adjacent zone was roughly 2 mm.

A 1991 PONTIAC GRAND PRIX™ vehicle was equipped with the unmodified standard catalytic converter and with the modified prototype apparatus. Third party independent testing was conducted in accordance with the United States Environmental Protection Agency's FTP-75 driving cycle. The vehicle was subjected to the driving cycle and average emissions for each part of the cycle were recorded. The emission results for the cold, transient and hot phases, respectively, are provided below in Tables 4, 5 and 6.

TABLE 4

Cold start phase emission results

| Emissions type | Commercial | | Prototype | |
| --- | --- | --- | --- | --- |
| | 40 km/h | Curb idle | 40 km/h | Curb idle |
| hydrocarbons (ppm) | 58 | 50 | 53 | 40 |
| carbon monoxide (%) | 0.05 | 0.02 | 0.03 | 0.01 |
| NO (ppm) | 254 | N/A | 186 | N/A |

TABLE 5

Transient phase emission results

| Emissions type | Commercial | | Prototype | |
| --- | --- | --- | --- | --- |
| | 40 km/h | Curb idle | 40 km/h | Curb idle |
| hydrocarbons (ppm) | 57 | 81 | 21 | 18 |
| carbon monoxide (%) | 0.06 | 0.03 | 0.01 | 0.01 |
| NO (ppm) | 79 | N/A | 6 | N/A |

TABLE 6

Hot start phase emission results

| Emissions type | Commercial | | Prototype | |
| --- | --- | --- | --- | --- |
| | 40 km/h | Curb idle | 40 km/h | Curb idle |
| hydrocarbons (ppm) | 0 | 0 | 0 | 0 |
| carbon monoxide (%) | 0.00 | 0.00 | 0.00 | 0.00 |
| NO (ppm) | 0 | N/A | 0 | N/A |

While the applicant's teachings are described in conjunction with various embodiments, it is not intended that the applicant's teachings be limited to such embodiments. The applicant's teachings encompass various alternatives, modifications, and equivalents, as will be appreciated by those of skill in the art.

What is claimed is:

1. A catalytic converter apparatus for use in an exhaust system of an internal combustion engine, the apparatus comprising:
    a catalytic converter housing including a single gas inlet and a single gas outlet; a substrate element arranged in the housing, the substrate element carrying catalytic material and having a plurality of zones, each of the zones defining a generally separate flow passage, the flow passages, at one end of the substrate, merging together interiorly of the housing to connect to the inlet and, at the other end of the substrate, merging together interiorly of the housing to connect to the outlet; and at least one wall at least partially separating the zones from one another, the at least one wall being adapted to inhibit heat flow between the zones and being generally impervious to gas flow between the zones,
    wherein the substrate is a unitary substrate, each of the zones is a honeycomb substrate, the zones, in use, cause the exhaust stream to separate into a plurality of individual streams and the honeycomb substrate wall thickness is a constant applicable to all zones.

2. The apparatus of claim 1, wherein the substrate is a unitary substrate, each of the zones is a honeycomb substrate, the honeycomb substrate wall thickness is a constant applicable to all zones.

3. The apparatus of claim 1, wherein the at least one wall separates the zones along substantially an entire length of the zones in a direction extending from the inlet to the outlet.

4. The apparatus of claim 1, wherein the zones comprise a central zone and at least one radial zone.

5. The apparatus of claim 1, wherein the at least one substrate element substantially fills the housing in a radial dimension perpendicular to a direction of gas flow extending from the inlet to the outlet.

6. The apparatus of claim 1, wherein the zones are arranged generally in parallel in a direction of gas flow extending from the inlet to the outlet.

7. The apparatus of claim 1, wherein each of the zones is of like cross-sectional shape in a plane orthogonal to a direction of gas flow.

8. A method of reducing emissions from an internal combustion engine as set forth in claim 1, the method comprising:
    a) delivering an exhaust gas stream from the internal combustion engine to at least one substrate element having a plurality of zones, the at least one substrate element including catalytic material located therein, the zones at least partially separated from one another by insulating material so that heat flow between the zones is at least partially inhibited by the insulating material, each of the zones defining a generally separate flow passage, the flow passages, at one end of the substrate, merging together interiorly of the housing, and at the other end of the substrate, merging together interiorly of the housing; and
    b) passing the stream through the substrate element thereby causing the stream to separate into a plurality of individual streams, the individual streams reacting with the catalytic material of the substrate element to form a plurality of treated streams; and
    c) expelling the treated streams.

* * * * *